US008856926B2

(12) United States Patent
Narayanaswamy et al.

(10) Patent No.: US 8,856,926 B2
(45) Date of Patent: Oct. 7, 2014

(54) DYNAMIC POLICY PROVISIONING WITHIN NETWORK SECURITY DEVICES

(75) Inventors: Krishna Narayanaswamy, San Jose, CA (US); Prashanth Arun, San Mateo, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1275 days.

(21) Appl. No.: 12/468,905

(22) Filed: May 20, 2009

(65) Prior Publication Data

US 2009/0328219 A1 Dec. 31, 2009

Related U.S. Application Data

(60) Provisional application No. 61/076,448, filed on Jun. 27, 2008.

(51) Int. Cl.
*G06F 21/00* (2013.01)
*G06F 7/04* (2006.01)
*G06F 15/173* (2006.01)
*G06F 17/30* (2006.01)

(52) U.S. Cl.
USPC ........ 726/23; 726/1; 726/11; 726/13; 726/22; 713/164; 713/166; 713/188; 713/193

(58) Field of Classification Search
USPC ....................................................... 709/239
See application file for complete search history.

(56) References Cited

U.S. PATENT DOCUMENTS

| 679,202 | A | 7/1901 | Althuasse et al. |
|---|---|---|---|
| 5,787,253 | A | 7/1998 | McCreery et al. |
| 6,219,786 | B1 | 4/2001 | Cunningham et al. |
| 6,301,668 | B1 | 10/2001 | Gleichauf et al. |
| 6,499,107 | B1 | 12/2002 | Gleichauf et al. |
| 6,751,728 | B1 | 6/2004 | Gunter et al. |
| 6,772,345 | B1 | 8/2004 | Shetty |
| 6,789,116 | B1 | 9/2004 | Sarkissian et al. |
| 6,801,940 | B1 * | 10/2004 | Moran et al. .................. 709/224 |
| 6,918,034 | B1 | 7/2005 | Sengodan et al. |
| 7,007,301 | B2 | 2/2006 | Crosbie et al. |
| 7,065,657 | B1 | 6/2006 | Moran |

(Continued)

OTHER PUBLICATIONS http://pdf.aminer.org/000/309/890/optimizing_pattern_matching.pdf "Optimizing Pattern Matching for Intrusion Detection"—May 2006 Mar Norton.*

(Continued)

*Primary Examiner* — Randy Scott
(74) *Attorney, Agent, or Firm* — Shumaker & Sieffert, P.A.

(57) ABSTRACT

The invention is directed to techniques for dynamic policy provisioning. A network security device may comprise a memory that stores a first policy that identifies a first set of patterns that correspond to a first set of network attacks and a second policy, and a control unit that applies the first policy to the network traffic to detect the first set of network attacks. The control unit, while applying the first policy, monitors parameters corresponding to one or more resources and dynamically determines whether to apply a second policy to the network traffic based on the parameters. The control unit, based on the dynamic determination, applies the second policy to the network traffic to detect a second set of network attacks and forwards the network traffic based on the application of the second policy. In this manner, the network security device may implement the dynamic policy provisioning techniques.

31 Claims, 8 Drawing Sheets

(56) References Cited

U.S. PATENT DOCUMENTS

| | | | |
|---|---|---|---|
| 7,076,803 | B2 | 7/2006 | Bruton, III et al. |
| 7,100,201 | B2 | 8/2006 | Izatt |
| 7,174,566 | B2 | 2/2007 | Yadav |
| 7,222,366 | B2 | 5/2007 | Bruton, III et al. |
| 7,240,368 | B1 | 7/2007 | Roesch et al. |
| 7,277,404 | B2 | 10/2007 | Tanzella et al. |
| 7,322,044 | B2 | 1/2008 | Hrastar |
| 7,324,447 | B1 | 1/2008 | Morford |
| 7,324,804 | B2 | 1/2008 | Hrastar et al. |
| 7,331,061 | B1 | 2/2008 | Ramsey et al. |
| 7,383,577 | B2 | 6/2008 | Hrastar et al. |
| 7,441,267 | B1 | 10/2008 | Elliott |
| 7,509,380 | B2 | 3/2009 | Motoyama |
| 7,526,541 | B2 | 4/2009 | Roese et al. |
| 2002/0055998 | A1 | 5/2002 | Riddle et al. |
| 2002/0078370 | A1 | 6/2002 | Tahan |
| 2002/0124187 | A1 | 9/2002 | Lyle et al. |
| 2002/0143939 | A1 | 10/2002 | Riddle et al. |
| 2002/0144156 | A1 | 10/2002 | Copeland, III |
| 2002/0198981 | A1 | 12/2002 | Corl, Jr. et al. |
| 2003/0065953 | A1 | 4/2003 | Lehmann et al. |
| 2003/0105976 | A1 | 6/2003 | Copeland, III |
| 2003/0131263 | A1 | 7/2003 | Keane et al. |
| 2003/0145225 | A1* | 7/2003 | Bruton et al. .......... 713/201 |
| 2003/0149887 | A1 | 8/2003 | Yadav |
| 2003/0154399 | A1 | 8/2003 | Zuk et al. |
| 2003/0182580 | A1 | 9/2003 | Lee |
| 2003/0204632 | A1 | 10/2003 | Willebeek-LeMair et al. |
| 2003/0212903 | A1 | 11/2003 | Porras et al. |
| 2003/0217289 | A1 | 11/2003 | Ammon et al. |
| 2003/0236990 | A1 | 12/2003 | Hrastar et al. |
| 2004/0015579 | A1 | 1/2004 | Cooper et al. |
| 2004/0025044 | A1 | 2/2004 | Day |
| 2004/0034800 | A1 | 2/2004 | Singhal et al. |
| 2004/0083299 | A1 | 4/2004 | Dietz et al. |
| 2004/0151382 | A1 | 8/2004 | Stellenberg et al. |
| 2004/0181690 | A1 | 9/2004 | Rothermel et al. |
| 2004/0255167 | A1 | 12/2004 | Knight |
| 2004/0268149 | A1 | 12/2004 | Aaron |
| 2004/0268150 | A1 | 12/2004 | Aaron |
| 2005/0018618 | A1 | 1/2005 | Mualem et al. |
| 2005/0044406 | A1 | 2/2005 | Stute |
| 2007/0056038 | A1* | 3/2007 | Lok .......................... 726/23 |
| 2007/0204341 | A1* | 8/2007 | Rand et al. ............... 726/22 |
| 2008/0100442 | A1* | 5/2008 | Grunwald et al. ....... 340/572.1 |
| 2008/0163356 | A1 | 7/2008 | Won-Jip et al. |
| 2009/0109845 | A1* | 4/2009 | Andreasen et al. ...... 370/230 |

OTHER PUBLICATIONS http://www.1st-computer-networks.co.uk/PDF/Reflex_Interceptor_1000.pdf "Reflex Interceptor 1000"—Reflex Security, Jun. 2007.*

Yannakakis, Perspectives on Database Theory, IEEE, Proceedings of 36th Annual Symposium on Foundations of Computer Science, Milwaukee, Wisconsin, Oct. 23-25, 1995, 25 pgs.

Roelker, (Snort User Manual, HTTP inspect readme), Aug. 11, 2004, see §§ 2.1.7, 2.1.8, 2.1.10, 7 pgs.

Bitpipe, Reflex Interceptor Management Console Product Description, May 25, 2004, 1 pg.

Reflex Security, Reflex Interceptor Management Console Whitepaper, Jan. 29, 2004, 2 pgs.

Wikipedia, Cisco PIX, Apr. 9, 2009, 11 pgs.

"Intrusion Detection and Prevention," OneSecure, Inc., 2001 p. 1-6.

"Ethereal 0.10.0 has been released", Dec. 12, 2003, www.ethereal.com, retrieved from the Internet Archive WayBackMachine, indexed Jan. 1, 2004, 23 pgs.

"Norton Internet Security™ 2003 User's Guide," 2002, Symantec Corporation, 255 pgs.

Office Action in corresponding Chinese Patent Application No. 200910151518.4, mailed Jul. 14, 2011, 6 pgs.

Extended European Search Report dated Jun. 26, 2014 in corresponding EP Application No. 09163021.0, 7 pgs.

* cited by examiner

DYNAMIC POLICY PROVISIONING WITHIN NETWORK SECURITY DEVICES

This application claims the benefit of U.S. Provisional Application No. 61/076,448, filed Jun. 27, 2008, which is hereby incorporated by reference in its entirety.

TECHNICAL FIELD

The invention relates to computer networks and, more particularly, to provisioning network devices of computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a number of different services, operating systems (or operating system versions) and communication protocols. Each of the different services, operating systems and communication protocols may expose the network to different security vulnerabilities. A malicious user or "hacker" may exploit these security vulnerabilities to gain unauthorized access to, disrupt or generally attack the network.

Typically, techniques for detecting these network attacks use pattern matching. In particular, an Intrusion Detection and Prevention device ("IDP") may reside at an edge of a network and be statically configured or provisioned to apply regular expressions or sub-string matches to detect defined attack patterns within data streams entering the network. Some networks may feature more or less security vulnerabilities that require the IDP device to be statically provisioned to identify and/or prevent more or less attacks. Alternatively, the IDP device may be statically configured or provisioned to detect not only the harmful attacks but also those attacks that pose little to no security threat to the network, as these harmless attacks may provide a network administrator with information concerning malicious activity in general and increase network security.

However, this additional information does not come without a cost due, in part, to the static manner in which most IDP devices are provisioned. To provide information regarding both harmful and harmless attacks, the IDP device may be statically configured to detect a full set or range of attack patterns, which consumes significant device resources (e.g., processor cycles, memory, etc.). During times of high network congestion, the IDP device may be unable to process all of the data and delay, if not prevent, delivery of the data to preserve network security by denying entry to unanalyzed data. Thus, by provisioning the IDP device to detect and/or prevent the full set or range of attack patterns, the IDP device may, during times of high network congestion, compromise network connectivity.

SUMMARY

In general, the invention is directed to techniques for dynamically provisioning services offered by network security devices, such as IDP devices. The dynamic provisioning may occur automatically or without user or administrator intervention in response to changes in resource utilization and consumption within the IDP device in response to network conditions. In other words, the IDP device may automatically select different policies to adapt or compensate for particular internal resource utilization, where the different policies provision the specific security services to be applied by the IDP device. The different policies may, for example, define a gradient of security services ranging from none or light-weight to a complete, rich set of security services. Alternatively, or in addition, certain policies may be used to limit the application of those security services to a range of the current packet flows through the IDP device, such as all packet flows, only existing packet flows, only packet flows matching certain criteria, and the like. In this manner, the IDP device may automatically account for and adapt to changes to network conditions by dynamically selecting different policies based on internal resource consumption and utilization within the device, and those policies may be mapped to resource utilization thresholds specified by an administrator so as to account for changing network conditions. In this way, the administrator can possibly balance network safety and security with network connectivity without greatly increasing network costs, incurring inefficiencies or requiring frequent static reconfiguration of the IDP device.

For example, an IDP device may receive network traffic and apply a first policy to the network traffic to detect a first set of network attacks. The first policy may identify a first set of attack patterns that correspond to the first set of network attacks. While applying attack definitions specified by this first policy, the IDP device may periodically monitor parameters corresponding to one or more resources internal to the IDP device. For example, the IDP device may monitor such parameters as a queue depth, a memory resource (e.g., available space), a queue threshold, a processor or central processing unit utilization, a number of sessions, a prioritization scheme, a quality of service, a timestamp, a time of day, or any other parameter related to resources, such as a queues (or more generally, a memory), a processor, a CPU, a clock, etc.

In some instances, the IDP device may calculate, based on the parameters, an overall indicator that represents a condition of a network in which the IDP device operates and the IDP device's ability to adequately service that network based on utilization of internal resources of the IDP device. This indicator may be tailored to give preferences (e.g., weighted averages) to certain parameters. Thus, the indicator may be configured to reflect preferences of a network administrator and/or particular circumstances of the network in which the IDP device operates.

Based on the monitored parameters, the IDP device may then dynamically switch to application of attack definitions identified by a second policy, and may apply those attack definitions to at least a portion of the network traffic based on the parameters. In the above instance where the IDP device calculates the indicator, the IDP device may determine when to dynamically apply the second policy by comparing the indicator to one or more defined thresholds, e.g., such as a normalized scale with thresholds defined along that scale, and selecting the appropriate policy based on the indicator relative to the defined thresholds. In some cases, the administrator or other user may interact with a user interface to define the thresholds as well as the weighted averages applied to the monitored parameters. Further, the thresholds may be dynamically configured and/or adjusted by the IDP device using historical averages and/or adaptive learning techniques or algorithms.

In this manner, the IDP device may implement the dynamic policy provisioning techniques to balance both security and network connectivity concerns without requiring administrator intervention in response to changing network conditions, as the thresholds may trigger the IDP device to select and apply different policies automatically in response to monitored conditions of the network. As one example, an administrator may configure the IDP device to apply a set of attack definitions specified by a first policy to the network traffic to detect a full set of known network attacks and a second policy to the network traffic to detect only a subset (i.e., less than all) of the full set of known network attacks. The administrator may also configure thresholds that trigger the IDP device to apply the first policy during times of relatively normal or low network congestion, as represented by an indicator that takes into account the particularities of the network, and the second policy during time of relatively high network congestion, again as represented by the indicator.

In one embodiment, a method comprises receiving, with a network security device of a network, network traffic, applying, with the network security device, a first policy to the network traffic to detect a first set of network attacks, wherein the first policy identifies a first set of attack patterns that correspond to the first set of network attacks and monitoring, with the network security device, parameters corresponding to utilization of one or more internal resources of the network security device. The method also comprises dynamically determining, with the network security device, when to apply a second policy to at least a portion of the network traffic based on the monitored parameters for the utilization of the one or more internal resources of the network security device and applying, with the network security device, the second policy to at least the portion of the network traffic to detect a second set of network attacks based on the dynamic determination. The second policy identifies a second set of attack patterns that correspond to the second set of network attacks, and the first set of attack patterns and the second set of attack patterns identify at least one different attack pattern. The method further comprises forwarding, with the network security device, at least the portion of the network traffic based on the application of the second policy.

In another embodiment, a network security device of a network that receives network traffic comprising a memory that stores a first policy and a second policy, wherein the first policy identifies a first set of attack patterns that correspond to a first set of network attacks, the second policy identifies a second set of attack patterns that correspond to the second set of network attacks, and the first set of attack patterns and the second set of attack patterns identify at least one different attack pattern. The network security device also comprising a control unit that applies the first policy to the network traffic to detect the first set of network attacks, monitors parameters corresponding to utilization of one or more internal resources of the network security device, dynamically determines when to apply a second policy to at least a portion of the network traffic based on the monitored parameters for the utilization of the one or more internal resources of the network security device, applies the second policy to at least the portion of the network traffic to detect a second set of network attacks based on the dynamic determination, and forwards at least the portion of the network traffic based on the application of the second policy.

In another embodiment, a network system comprises a plurality of computing nodes of a network that transmit and receive network traffic, a plurality of network security devices of the network that process the network traffic and a network security manager (NSM) device that distributes a plurality of policies to each of the plurality of network security devices. Each of the plurality of network security devices includes a memory that stores a first one of the plurality of policies and a second one of the plurality of policies, wherein the first one of the plurality of policies identifies a first set of attack patterns that correspond to a first set of network attacks, the second one of the plurality of policies identifies a second set of attack patterns that correspond to the second set of network attacks, and the first set of attack patterns and the second set of attack patterns identify at least one different attack pattern. Each of the plurality of network security devices further includes a control unit that applies the first one of the plurality of policies to the network traffic to detect the first set of network attacks, monitors parameters corresponding to one or more internal resources of the network security device, dynamically determines when to apply a second one of the plurality of policies to at least a portion of the network traffic based on the monitored parameters for the utilization of the one or more internal resources of the network security device, applies the second one of the plurality of policies to at least the portion of the network traffic to detect a second set of network attacks based on the dynamic determination, and forwards at least the portion of the network traffic based on the application of the second one of the plurality of policies.

In another embodiment, a computer-readable medium contains instructions that cause a programmable processor to receive, with a network security device of a network, network traffic, apply, with the network security device, a first policy to the network traffic to detect a first set of network attacks, wherein the first policy identifies a first set of attack patterns that correspond to the first set of network attacks and monitor, with the network security device, parameters corresponding to utilization of one or more internal resources of the network security device. The instructions further cause the programmable processor to dynamically determine, with the network security device, when to apply a second policy to at least a portion of the network traffic based on the monitored parameters for the utilization of the one or more internal resources of the network security device, apply, with the network security device, the second policy to at least the portion of the network traffic to detect a second set of network attacks based on the dynamic determination, wherein the second policy identifies a second set of attack patterns that correspond to the second set of network attacks, and wherein the first set of attack patterns and the second set of attack patterns identify at least one different attack pattern and forward, with the network security device, at least the portion of the network traffic based on the application of the second policy.

In another embodiment, a method comprises receiving, with a network security device of a network, network traffic, wherein the network security device internally comprises a first path for processing initial packets of new packet flow and a fast path for processing packets for existing packet flows, applying, with the network security device, a first policy to the network traffic to detect a first set of network attacks, wherein the first policy identifies a first set of attack patterns that correspond to the first set of network attacks, and monitoring, with the network security device, parameters corresponding to utilization of one or more internal resources of the network security device. The method also comprises dynamically determining, with the network security device, when to apply a second policy to at least a portion of the network traffic based on the monitored parameters for the utilization of the one or more internal resources of the network security device, applying, with the network security device, the second policy based on the dynamic determination, wherein the second policy specifies that the first set of attack patterns are to be applied to all the packets of the fast path for the existing packet flows setup prior to the dynamic determination and without application to all the packets of the new flows that go through the first path after the dynamic determination, and forwarding, with the network security device, at least the portion of the network traffic based on the application of the second policy.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
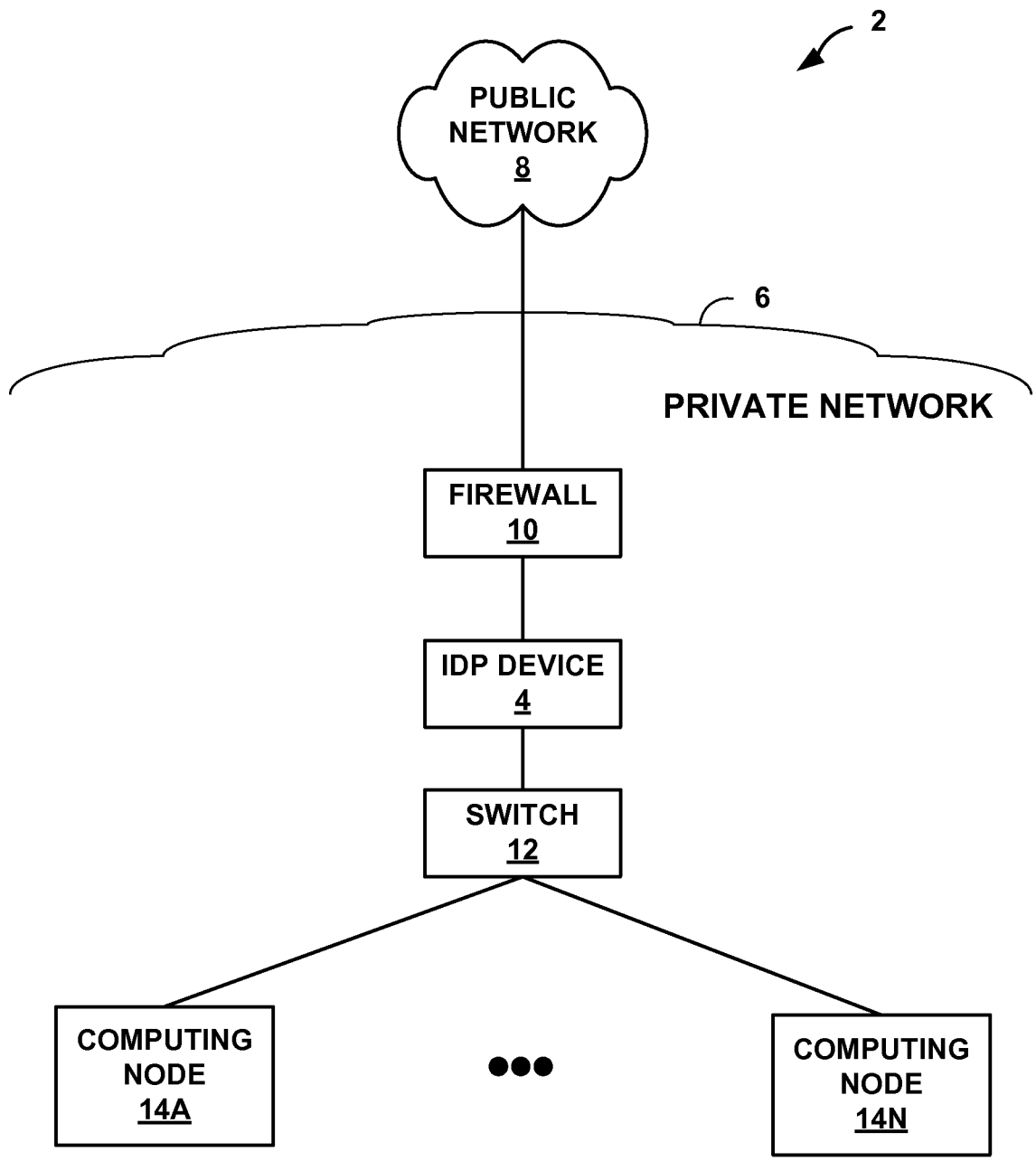
FIG. 1 is a block diagram illustrating an exemplary network system in which an intrusion detection and prevention device performs dynamic policy provisioning techniques in accordance with the principles of the invention.

FIG. 1 is a block diagram illustrating an exemplary network system 2 in which an intrusion detection and prevention device 4 performs dynamic policy provisioning techniques in accordance with the principles of the invention. Intrusion Detection and Prevention device 4 ("IDP device 4") represents one example of a network security device, and although described below in reference to IDP device 4, the dynamic policy provisioning techniques may be implemented by any network security device to automatically balance safety and network connectivity concerns in response to changing conditions within a network, such as a private network 6.

As shown in FIG. 1, network system 2 includes a public network 8 and private network 6, where private network 6 couples to public network 8. Public network 8 may comprise any publically accessible computer network, such as the Internet. Public network 8 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, public network 8 may represent or be referred to as a "packet-based" computer network.

Private network 6 may represent a network that is owned, operated and maintained typically by a private entity, such as an enterprise or business, and which is not generally accessible by the public. Private network 6 includes a firewall 10, a switch 12, a plurality of computing nodes 14A-14N ("computing nodes 14") and IDP device 4. Firewall 10 may represent a network security device that protects private network 6 and, in particular, computing nodes 14. Firewall 10 usually protects these nodes 14 by performing gatekeeper services, such as access control or Network Address Translation (NAT). Usually, these gatekeeper services rely solely on network layer information, such as IP addresses and ports, parsed from a header of each packet.

In other words, firewall 10 may act as a gatekeeper to private network 6 by inspecting IP addresses and ports to ensure that traffic entering private network 6 only enters in response to a previously sent traffic from one or more of computing nodes 14. This, in effect, helps reduce unauthorized access to private network 6, much like a gatekeeper, thereby possibly preventing the public from accessing private network 6. Firewall 10 may also, by performing NAT, obscure an internal configuration of private network 6 to prevent malicious entities or "hackers" from utilizing known weaknesses in the internal configuration.

Switch 12 represents a network device capable of performing routing of traffic among various end-points, such as computing nodes 14. Switch 12 may therefore switch the flow of traffic to deliver particular packets to corresponding ones of computing nodes 14. While shown as a single switch 12, private network 6 in conjunction with or as an alternative to switch 12 may employ a hub, a router or other network device capable of performing switching and/or routing of data to and from nodes 14. Moreover, while shown as comprising a single firewall device 10 and a single switch 12 for ease of illustration purposes, private network 6 may include a plurality of firewalls similar to firewall 10 and a plurality of switches similar to switch 12. The techniques therefore should not be limited to the exemplary embodiment shown in FIG. 1.

IDP device 4 may comprise a network security device capable of detecting and possibly preventing network attacks. Typically, IDP device 4 applies one or more polices to detect one or more sets of network attacks. Each policy may define a set of attack patterns, or patterns, that correspond to the set of network attacks and which when applied to both incoming and outgoing traffic may enable IDP device 4 to detect each corresponding set of network attacks. "Incoming network traffic," as used herein, may comprise both traffic leaving and entering private network 6 and thus refers to traffic incoming with respect to IDP device 4. Likewise, "outgoing traffic" may not refer to any particular direction but merely to traffic leaving IDP device 4 from the perspective of IDP device 4. Thus, incoming and outgoing may refer to the direction of traffic from the perspective of IDP device 4 and do not denote any particular direction or flow of traffic between private and public networks 6 and 8, respectively.

IDP device 4 may apply these policies by applying the patterns identified by these policies to network traffic flowing in both directions (i.e., inbound traffic received from public network 8 as well as outbound traffic destined to the public network) to improve the accuracy in detecting network attacks. For example, IDP device 4 may apply these patterns to both client-to-server and server-to-client communications between public network 8 and computing nodes 14. IDP device 4 may also analyze the network traffic to correlate traffic in one direction with traffic in the opposite direction for each communication session detected within the network traffic. For each client-server communication session, IDP device 4 may identify a packet flow in one direction (e.g., a client-to-server communication flow for a particular software application on the client) and a corresponding packet flow in the opposite direction (e.g., response communications flowing from the server to the client for that same software application).

IDP device 4 may identify the packet flows in the monitored traffic, and transparently reassembles application-layer communications from the packet flows. IDP device 4 may include a set of protocol-specific decoders to analyze the application-layer communications and identify application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder may be invoked by IDP device 4 to identify each request/response within the TCP connection as a different transaction. This may be useful to prevent certain attack definitions or patterns from being applied across transaction boundaries. In one embodiment, a transaction may be identified according to source and destination IP address, protocol, and source and destination port numbers. Other embodiments may identify a transaction in other ways, for example, by using media access control ("MAC") addresses.

For each transaction, the corresponding decoder may analyze the application-layer communications and extract protocol-specific elements. As an example, for an FTP login transaction, the FTP decoder may extract data corresponding to a user name, a name for the target device, a name for the client device and other information. In addition, the decoders may analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules may, for example, be defined by published standards as well as vendor-defined specifications. Other anomalies refer to protocol events (i.e., actions) that technically comply with protocol rules but that may warrant a heightened level of scrutiny.

One example of such a protocol event is repeated failure of a File Transfer Protocol (FTP) login request. Example anomalies for the HTTP protocol include missing HTTP version information, malformed universal resource identifiers ("URIs"), directory traversals, header overflow, authentication overflow and cookie overflow. Example anomalies for a Simple Mail Transfer Protocol (SMTP) include too many recipients, relay attempts, and domain names that exceed a defined length. Example anomalies for a Post Office Protocol version 3 (POP3) include user overflow and failed logins. Additional anomalies for FTP include missing arguments, usernames or pathnames that exceed a defined length and failed logins. Other anomalies include abnormal and out-of-specification data transmissions, and commands directing devices to open network connections to devices other than the client devices issuing the commands.

IDP device 4 may apply the patterns to the protocol elements extracted by the protocol decoders to detect and prevent network attacks. These patterns, when applied to received traffic, may therefore identify one or more attack signatures, protocol anomalies and other malicious behavior based on application layer data and other stateful protocol information. Moreover, IDP device 4 may associate particular patterns with protocols that correspond to particular applications. For a given communication session intercepted by IDP device 4, IDP device 4 may attempt to identify the application type and underlying protocol for the packet flows of the session in order to select one or more patterns to apply to the packet flows. In the event IDP device 4 detects a network attack, IDP device 4 may take one or more programmed actions, such as automatically dropping packet flows associated with the application-layer communications within which the network attack was detected or resetting the connection to prevent the attack, thereby preserving network security.

In accordance with the dynamic policy provisioning techniques described herein, IDP device 4 may dynamically provision the application of policies in response to changing network conditions. In other words, IDP device 4 may automatically adapt the application of policies to suit or compensate for particular network conditions. To this end, IDP device 4 may monitor private network 6 to determine a condition of network 6, e.g., a high, normal or low network congestion level. In response to each observed condition, IDP device 4 may apply a different set of patterns as identified by the corresponding policies, where each of these different sets of patterns include at least one pattern different from every other set of patterns. As a result, IDP device 4 may tailor the application of patterns to address changing network congestions, for example, and thereby possibly balance safety and network connectivity concerns while also possibly reducing costs and improving device efficiency or resource utilization.

For example, IDP device 4 of private network 6 may receive network traffic and apply a first policy to the network traffic to detect a first set of network attacks. The first policy may identify a first set of patterns that correspond to the first set of network attacks. While applying this first policy, IDP device 4 may monitor parameters corresponding to utilization of one or more internal resources of IDP device 4. For example, IDP device 4 may monitor such parameters as a queue depth, a memory resource (e.g., available space), a queue threshold, a processor or central processing unit utilization, a number of sessions, a timestamp, a time of day, or any other parameter related to the utilization of internal resources, such as a queues (or more generally, a memory), a processor, a CPU, a clock, etc. The parameters may be referred to as "vital" parameters in that they monitor system resources of IDP device 4 vital to the operation of IDP device 4.

In some instances, IDP device 4 may calculate, based on the parameters, an indicator that represents a condition of private network 6. In some instances, IDP device 4 may monitor a plurality of the above listed parameters, multiply each observed parameters with an associated weight to determine a plurality of weighted parameters, and average these weighted parameters to calculate or determine the indicator as a weighted average of the parameters. This weighted average may not only represent the condition of the private network 6 but also be tailored to give preference to certain parameters by adjusting the corresponding weight by which the given parameter is multiplied. Thus, the indicator may be configured to reflect preferences of a network administrator or other user and/or particular circumstances of network 6 in which IDP device 4 operates.

IDP device 4 may then dynamically determine whether to apply a second policy to at least a portion of the network traffic based on the monitored parameters for the utilization of the one or more internal resources of the network security device. The second policy may identify a second set of attack patterns that correspond to the second set of network attacks. Also, the first set of attack patterns and the second set of attack patterns may identify at least one different attack pattern. In other words, the first and second set of attack patterns may comprise at least one different attack pattern.

In the above instance where IDP device 4 calculates an indicator, IDP device 4 may determine when to dynamically apply the second policy by comparing the indicator to one or more thresholds. These thresholds may be dynamically configured by IDP device 4 using historical averages and/or adaptive learning techniques or algorithms or by the administrator or other user. The threshold also may be associated with a respective policy. If the indicator equals or exceeds one of the thresholds, IDP device 4 may apply the second or corresponding policy to at least a portion of the network traffic, but if not, IDP device 4 may continue to apply the first policy. Thus, IDP device 4 may apply the second policy, instead of the first, based on the dynamic determination. Assuming IDP device 4 dynamically applies the second policy, IDP device 4 forwards at least a portion of the network traffic based on the application of the second policy.

In this manner, IDP device 4 may implement the dynamic policy provisioning techniques to balance both security and network connectivity concerns without requiring administrator intervention to statically reconfigure conventional network security devices, as the thresholds may trigger IDP device 4 to apply different policies automatically in response to monitored conditions of network 6. As one example, an administrator may configure IDP device 4 to apply a first policy that identifies a full set of patterns that correspond to a full set of known network attacks and a second policy that identifies a subset of the full set of patterns that correspond to a subset of the full set of known network attacks.

The second policy may, for example, identify a subset of the full set of patterns that correspond to the subset of the full set of known network attacks that were announced in the past few months or some other configurable amount of time. This second policy typically requires significantly less processing capacity. The administrator may also configure thresholds that trigger IDP device 4 to apply the first policy during times of relatively normal or low network congestion, as represented by an indicator that takes into account the particularities of network 6, and the second policy during time of relatively high network congestion, again as represented by the indicator.

The dynamic provisioning techniques may therefore comprise two parts, a system resource monitoring part and a prioritized service policies part. The first system resource monitoring part monitors the one or more parameters to determine what may be referred to as a system alert level, or indicator value. The second prioritized service policies part may prioritize the application of policies to address a given system alert level. By combining these two parts, a plurality of policies may be dynamically provisioned to adapt to current conditions of network 6. In dynamically changing between policies, system resource utilization may be increased or reduced as a result of applying more or less patterns, respectively. Adapting the policies based on dynamically monitored parameters may enable an IDP device to adapt intrusion detection and prevention to suit particular conditions.

For example, IDP device 4 may initially be provisioned to operate on a general policy that provides wide security coverage, e.g., applies the full set of patterns. The system resource monitor of IDP device 4 may execute periodically to evaluate the current condition of network 6 and signal one of a plurality of system alert levels. For each system alert level or indicator value, IDP device 4 may apply a corresponding policy such that when the service alert level or value of an indicator changes, the application of services, e.g., patterns, changes to the corresponding policy configured for that level or value. IDP device 4 may, as a result, adapt dynamically to varying conditions based on the periodic, and in some instances, constant feedback to adjust its service level in a much more fine-grained manner when compared to conventional, statically configured IDP devices.

Figure 2:
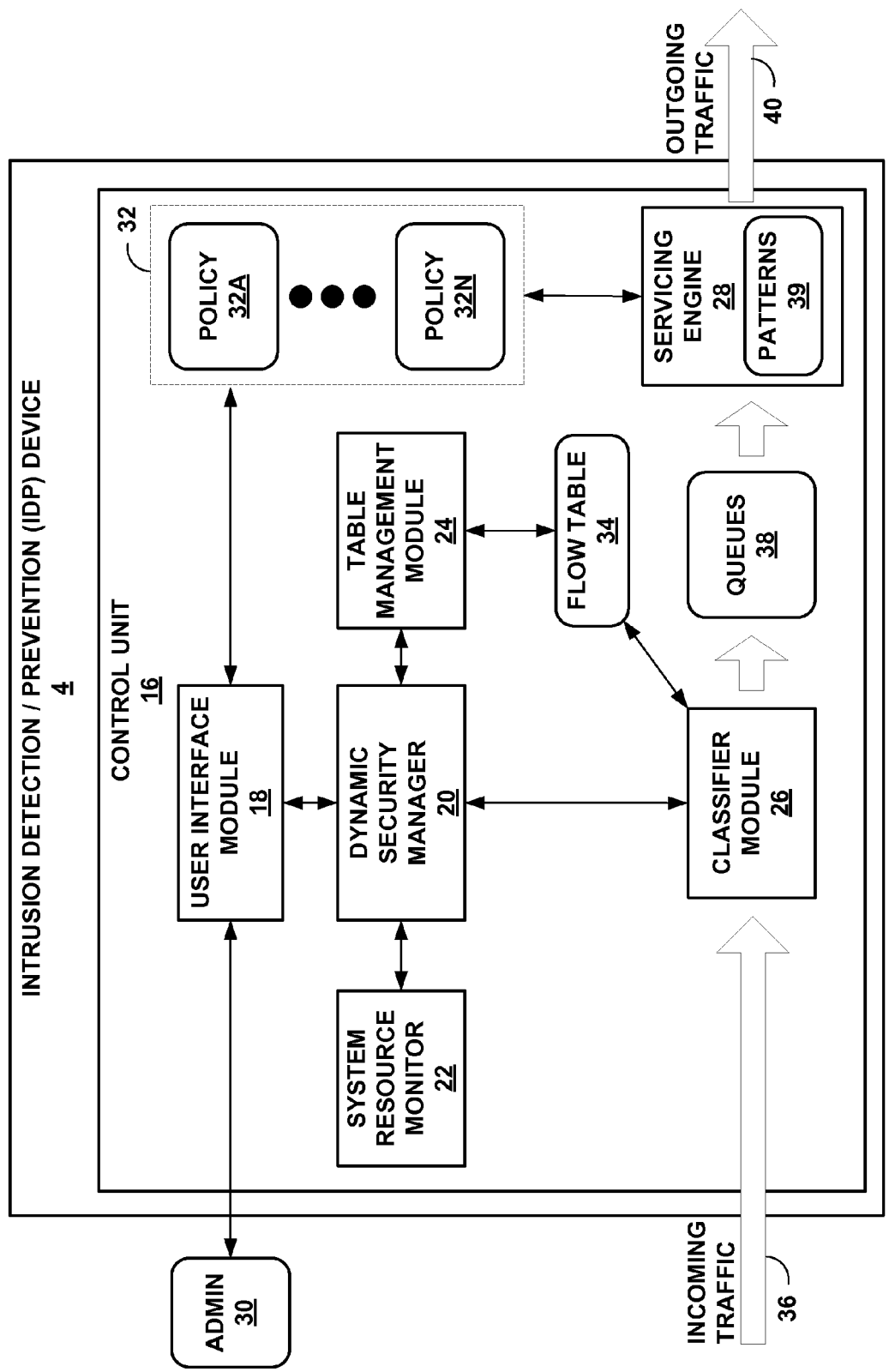
FIG. 2 is a block diagram illustrating the IDP device of FIG. 1 in more detail.

FIG. 2 is a block diagram illustrating IDP device 4 of FIG. 1 in more detail. IDP device 4 includes control unit 16, which may comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static memory (a hard drive, an optical drive, a disk drive, FLASH memory, etc.) and/or dynamic memory (a Random Access Memory or RAM, dynamic RAM or DRAM, etc.). In some instances, the computer-readable storage medium may comprise instructions, such as those used to define a software or computer program, that cause the above listed programmable processor to perform the dynamic policy provisioning techniques described herein.

Control unit 16 includes a user interface module 18, a dynamic security manager module 20 ("dynamic security manager 20"), a system resource monitor module 22 ("system resource monitor 22"), a table management module 24, a classifier module 26 and a servicing engine module 28 ("servicing engine 28"). Each of these modules 18-28 may comprise hardware, software or any combination thereof to perform the below described functions attributed to each. In some embodiments, control unit 16 may comprise one or more programmable processors that each executes one or more of modules 18-28 as software programs, e.g., instructions. In other embodiments, control unit 16 may comprise one or more integrated circuits that implement one or more of modules 18-28. The techniques therefore should not be limited to any one implementation of the dynamic policy provisioning techniques described herein.

User interface module 18 represents a module for interfacing with a user, such as an administrator 30 ("admin 30"), or another computing device. User interface module 18 may present one or more graphical user and/or text-based user interfaces by which admin 30 or another computing device may configure IDP device 4. User interface module 18 may, in some embodiments, enable script-based configuration by way of the text-based user interface, such as a command line interface (CLI).

Dynamic security manager 20 represents a module that dynamically provisions IDP device 4 to apply different policies, such as policies 32A-32N ("policies 32") based on a monitored condition of private network 6 or, more particularly, the above listed parameters. Dynamic security manager 20 may, in some embodiments, include a threshold by which to dynamically determine whether to apply one or more of policies 32 over another one or more of policies 32 to incoming network traffic 36 ("incoming traffic 36") to detect one or more corresponding sets of network attacks. In other embodiments, dynamic security manager 20 may execute a governance algorithm by which to dynamically determine whether to apply one or more of policies 32 over the other one or more policies 32. More detail concerning each of these embodiments is provided below with respect to FIGS. 3A and 3B, respectively.

System resource monitor 22 represents a module that periodically monitors the above described parameters corresponding to one or more system and other resources of IDP device 4. Table management module 24 represents a module that may periodically update a flow table, such as a flow table 34, to reflect changes in the application of policies 32, associate one or more of flows stored to flow table 34 together as a session and otherwise maintain or manage the flow stored to flow table 34.

Classifier module 26 represents a module that may classify each of the packets based on information extracted from each packet. One way in which classifier module 26 may classify a packet is to classify each packet as belonging to a particular flow. That is, classifier module 26 may determine to which flow a particular one of the packets of incoming network traffic 36 corresponds by extracting information referred to as a "five-tuple" from each of the packets. As described above, each flow represents a flow of packets in one direction within the network traffic. A five-tuple comprises a source Internet Protocol (IP) address, a destination IP address, a source port, a destination port, and a protocol. Typically, the five-tuple is found within the header of each of the packets and classifier module 26 may parse or otherwise extract the five-tuple from the header of each of the packets to identify to which flow each of the packets corresponds. Classifier module 26 may also extract and utilize additional information to identify a flow, such as source media access control ("MAC") address and destination MAC address.

Based on this five-tuple, classifier module 26 may access flow table 34 to determine which of policies 32 apply to each of the packets of incoming traffic 36. Flow table 34 may therefore maintain flows as entries, which may be referred to as "flow entries." Each flow entry may store the identifying five-tuple and a reference to one of policies 32. Classifier module 26 may access this table 34 to determine a flow to which each packet corresponds as well as an associated one of policies 32. Classifier module 26 may then tag or otherwise mark each packet to indicate an associated one of policies 32 to apply to each tagged packet. Classifier module 26 may tag each packet by storing metadata or other information with each packet in a queue, such as one of queues 38. Queues 38 may comprise pre-processing queues that store packets in a first-in, first-out (FIFO) manner prior to processing or application of an associated one of policies 32.

Classifier module 26 may also, as another way of classifying incoming packets, extract application layer information, such as Session Initiation Protocol (SIP) headers and payload data and Real-time Transportation Protocol (RTP) headers and payload data. Classifier module 26 may further include the above described protocol decoders (not shown in FIG. 2) to extract this application layer information or data to classify each packet. Classifier module 26 may associate each application with different ones of policies 32. That is, classifier module 26 may, based on information extracted by one or more of the above described decoders, determine that a first packet, for example, belongs to an HTTP application, while another packet belongs to an FTP application. Based on these respective classifications, classifier module 26 may associate a first one of policies 32 with the first packet classified as belonging to the HTTP application and associate a second one of policies 32 with the second packet classified as belonging to the FTP application in flow table 34. In this manner, IDP device 4 may adapt the application of policies 32, and thus patterns 39, to different applications, which may enable IDP device 4 to more accurately apply patterns 39 to detect only those network attacks that target a particular protocol, while not detecting those that are harmless to each of the respectively identified protocols to limit the consumption of system resources.

Servicing engine 28 represents a module that services or otherwise processes the packets of incoming traffic 36. Servicing engine 28 may service or process each packet by applying one of policies 32 to each packet. Each of policies 32 may identify a different set of patterns to apply, where each policy identifies at least one pattern different from every other one of policies 32. Servicing engine 28 may maintain a full set of patterns 39 that identify a full set of network attacks. Each of policies 32 may identify a set of patterns by indicating whether to apply the full set of patterns 39 or a subset of the full set of patterns 39. After processing each of the packets of incoming traffic 36, servicing engine 28 may, based the application of the corresponding policies 32, forward those packets as outgoing traffic, such as secure outgoing traffic 44A of FIG. 3A and secure outgoing traffic 46 of FIG. 3B.

Initially, admin 30 may interact with a user interface presented by user interface module 18 to define, create or otherwise specify each of policies 32. In some embodiments, IDP device 4 may be preconfigured with one or more of policies 32 such that admin 30 need not manually define every one of policies 32.

After configuring IDP device 4 in this manner, classifier module 26 may receive incoming traffic 36 and classify each packet of traffic 36 by extracting the above described five-tuple from each packet and perform the above described lookup in flow table 34 based on the extracted five-tuple. If the flow corresponding to the extracted five-tuple is not stored to flow table 34, classifier module 26 may add a flow corresponding to that five-tuple to the table and associate a policy with that new flow in flow table 34.

Classifier module 26 may determine the appropriate policy to associate with each new flow from dynamic security manager 20 or may maintain a configurable association between policies 32 and an application to which each packet is identified as belonging. That is, classifier module 26 may maintain a table that associates policy 32A, for example, with HTTP applications, policy 32B with FTP applications, and policy 32N with SIP applications. Admin 26 may configure this table via a user interface presented by user interface module 18. If the lookup returns a flow, e.g., the flow was previously created and stored to flow table 34, classifier module 26 may determine an associated one of policies 32 from a corresponding flow entry stored to flow table 34. Regardless of how the one of policies 32 is determined, classifier module 26 may then store the packet with a corresponding tag that identifies the associated one of policies 32 in one of queues 38.

Servicing engine 28 may retrieve these packets stored to queues 38 and apply the associated one of policies 32 identified by the corresponding tag. Servicing engine 40 may, for example, apply a first policy 32A, for example, to a packet retrieved from queues 38. Policy 32A may indicate or identify that a full set of known patterns 39, or simply patterns 39, be applied to the associated packet to identify a corresponding full set of known network attacks. Servicing engine 40, in according with policy 32A, may apply each of patterns 39 to the associated packet. Based on the application of policy 32A, e.g., whether any network attacks are identified though application of patterns 46, servicing engine 28 may forward the associated packet as outgoing traffic 40.

In parallel with or simultaneously to the above described operations, system resource monitor 22 may monitor one or more of the above listed parameters that correspond to one or more resources. In some instances, system resource monitor 22 may periodically monitor one or more of the above listed parameters. System resource monitor 22 may perform such monitoring every millisecond, every 10 milliseconds or some interval between these two intervals. Typically, system resource monitor 22 conducts this monitoring in such short periodic intervals to provide an effective and timely response to the overload condition.

As an example of monitoring a parameter, system resource monitor 22 may monitor queues 38 to determine a queue depth. A queue depth refers to the amount of storage space currently consumed by or used to store packets out of the total amount of storage space assigned to that queue. System resource monitor 22 may determine an average queue depth in one instance by monitoring each of queues 38 and averaging the depths of each of queues 38. Alternatively, system resource monitor 22 may monitor the depth of each of queues 38 and base the queue depth on the maximum queue depth of each of queues 38. System resource monitor 22 may also monitor thresholds of queues 38.

System resource monitor 22 may, as another example, monitor other memory resources, such as total memory capacity consumed or utilized, total random access memory capacity consumed, total cache memory capacity consumed, etc. System resource monitor 22 may, as yet another example, monitor utilization of a processor, such as a processor that executes either or both of classifier module 26 and servicing engine 28. System resource monitor 22 may also, as a further example, monitor the number of sessions and/or flows currently active in network 6 by accessing flow table 34 and determining the number of entries in flow table 34.

As additional examples, system resource monitor 22 may monitor timestamps or, more particularly, the difference between a timestamp that marks receipt of the packet by IDP device 4 and a timestamp that marks a time of forwarding of the same packet by IDP device 4. This difference may indicate the time required to process the packet. System resource monitor 22 may also determine a time of day. All of the above parameters may be indicative of or reflect a condition of network 6. For example, traffic levels and hence congestion may vary based on the time of day. A time to process a packet may also indicate increased congestion considering that typically as the times to process packets increases, network congestion levels also increase. System resource monitor 22 may pass these parameters to dynamic security manager 20 for further processing.

Upon receiving one or more of the above monitored parameters, dynamic security manager 20 may dynamically determine whether to apply a second one of policies 32 based on the parameters. These parameters may represent a condition of network 6, and therefore dynamic security manger 20 may dynamically determine whether to apply the second one of policies 32, e.g., conduct what may be referred to as a "policy change," based on a network condition as represented by the parameters. If dynamic security manager 20 determines that a new one of policies 32 should be applied, e.g., a policy different from the preceding policy, dynamic security manager 20 may inform table management module 24 and classifier module 26 of the new policy 32.

Table management module 24 may periodically update flow table 34 to reflect this change in the application of policies 32. Table management module 24 may not immediately update flow table 34 in response to every change so as not to consume system resources, as flow table 34 may contain thousands, if not hundreds of thousands, or more flow entries. Table management module 24 may therefore update each entry in flow table 34 to reflect the change from an old or first one of policies 32 to a new or second one of policies 32. As described above, classifier module 26 may use this change in application of policies 32 when adding a new flow entry to flow table 34. Upon receiving this change in application of policies 32, classifier module 26 may associate all new flows added to flow table 34 with this new one of policies 32.

Assuming dynamic security manager 20 dynamically determined to apply a new or second one of policies 32 to incoming traffic 36, table management module 24 may update flow table 34 to reflect this change in policy. Classifier module 26 may, by way of accessing flow entries of flow table 34 corresponding to five-tuples extracted from incoming packets, determine that at least some packets of incoming traffic 36 are associated with the new or second one of policies 32. Classifier module 26 may then associate each of these packets with a tag, metadata or other identifier that identifies this second one of policies 32 in queues 38. Upon retrieving these packets and associated tags from queues 38, servicing engine 28 may then apply the second one of policies 32 to those packets and forward those packets for which none of patterns 39 identified by the second one of policies 32 detect a network attack. In this manner, IDP device 4 may generally implement the dynamic policy provisioning techniques described herein.

Figure 3A:
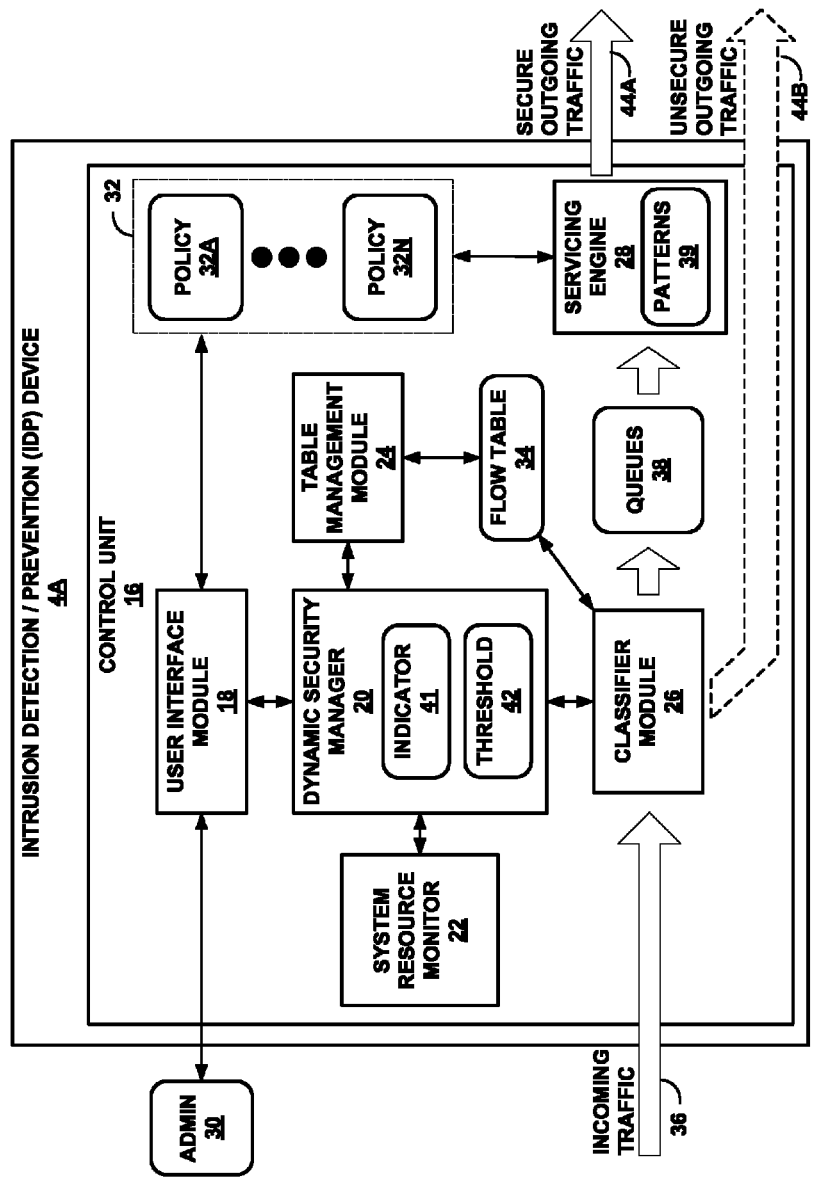
FIGS. 3A and 3B are block diagrams each illustrating an embodiment of the IDP device of FIG. 2 in more detail.
Figure 3B:
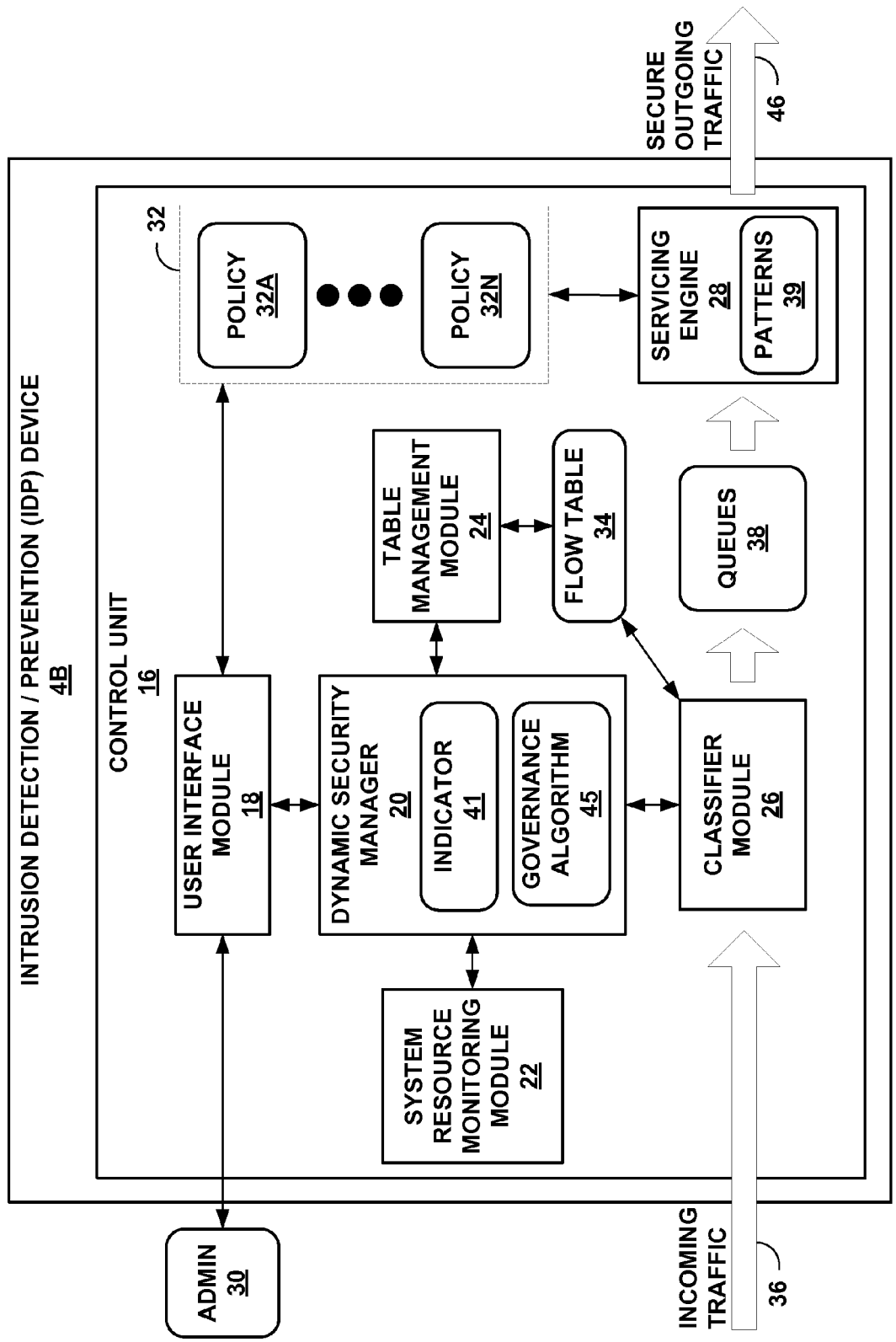

FIGS. 3A and 3B are block diagrams each illustrating an embodiment of IDP device 4 of FIG. 2 in more detail. FIG. 3A is a block diagram illustrating IDP device 4A in performing one aspect of the dynamic policy provisioning techniques described herein. IDP device 4A may be substantially similar to IDP device 4 of FIGS. 1 and 2 in that IDP device 4A may comprise similar units, modules, queues, etc.

As shown in FIG. 3A, dynamic security manager 20 includes an indicator 41 and a threshold 42. Dynamic security manager 20 may calculate indicator 41 based on the above described parameters such that indicator 41 reflects a condition of network 6. Dynamic security manager 20 may calculate indicator 41 by calculating a weighted average of one or more of the parameters. As described above, admin 28 may, via a user interface presented by user interface module 18, define the weights for each parameter. Dynamic security manager 20 may further normalize indicator 41 to enable a comparison to threshold 42.

Threshold 42 may represent a configurable data object that admin 30 may configure. Admin 30 may configure threshold 42 in a manner similar to that described above by interacting with the same or a different user interface presented by user interface module 18 to configure, specify or otherwise define threshold 42. Again, IDP device 4A may, in some embodiments, be preconfigured with at least one standard threshold 42, such that admin 30 need not enter a value for threshold 42. Based on this comparison, dynamic security manager 20 may determine which of policies 32 to apply to incoming network traffic 36. For example, if indicator 41 is less than threshold 42, dynamic security manager 20 may dynamically determine that policy 32A should be applied to all flows. However, if indicator 41 is equal to or greater than threshold 42, dynamic security manager 20 may determine that policy 32N should be applied to all flows, possibly instead of policy 32A.

In the example of FIG. 3A, dynamic security manager 20 may, upon indicator 41 equaling or exceeding threshold 42, indicate that classifier module 26 apply the new or second one of policies 32 only to a portion of incoming traffic 36. In some instances, dynamic security manager 20 may indicate that classifier module 26 only apply the new one of policies 32 to existing flows. In some instances, the second one of policies 32 may be the same as the first one of policies 32. In this respect, dynamic security manager 20 may not dynamically provision which of patterns 39 are applied, but instead vary to which type or classification of packets the same set of patterns 39 are applied. In other words, dynamic security manager 20 may dynamically provision application of policies 32 by specifying that the same one of policies 32 apply not to both the existing and new flows, but only to the existing flows, in order to reduce the consumption of system resources and improve network connectivity by sacrificing security.

These existing or currently active flows and packets associated with these existing or active flows may be referred to herein as "fast path" flows and "fast path" packets respectively. New flows and packets associated with these new flows may be referred to herein as "first path" flows and "first path" packets respectively. Classifier module 26 may perform additional analysis on first path packets, such as access control operations, NAT operations, etc., when compared to fast path packets. Moreover, classifier module 26 typically updates flow table 34 with a new flow entry to flow table 34 as well as extract application layer data to classify the flow and perform other operations not necessary once the new flow has been classified. Thus, packets associated with new flows require any number of first-time operations, hence the name "first path." In contrast, existing or currently active flows and corresponding packets require much less processing than the first path packets, thereby resulting in faster processing, hence the name "fast path."

Classifier module 26 of IDP device 4A may therefore only apply the new one of policies 32 to fast path packets while forwarding first path packets without applying the new one of policies 32 to these first path packets. Classifier module 26 may determine whether packets of incoming traffic 36 are first or fast path packets by performing a lookup using the above described five-tuple as a key when accessing flow table 34. If a flow entry exists in flow table 34, classifier module 26 may determine that the packet is a fast path packet and store the packet with a tag identifying the one of policies 32 associated with the flow in the corresponding flow entry to one of queues 38. However, if no flow entry exists in flow table 34, classifier module 26 may determine the packet is a first path packet and forward the packet without applying the new one of policies 32 to this first path packet. The forwarding of first path packets without applying the new one of policies 32 is illustrated in FIG. 3A by the dash-lined arrow denoted as "unsecure outgoing traffic 44B."

In this manner, IDP device 4A may dynamically provision the application of policies 32 to account for both security and network connectivity concerns, as service engine 28 may apply the first one of policies 32 to both first path and fast path packets during times of relatively normal or low network congestion, as indicated by indicator 41. The first one of policies 32 may comprise a policy that identifies a full set of patterns 39 and thus possibly provides a comprehensive level of security without overly decreasing network connectivity (as network congestion is low). However, during times of relatively high network congestion, as indicated by indicator 41, servicing engine 28 may apply a new one of policies 32 only to the fast path packets, while forwarding first path packets without applying the new policy, to preserve network connectivity.

The new one of policies 32 may identify only those patterns 39 that correspond to critical network attacks or, in other words, those attacks that have a major impact on the civility of network 6, which may be referred to herein as "major civility patterns." Applying these major civility patterns may be referred to as applying a particular type of service or security service. Other patterns may correspond to other types of network attacks, such as minor civility attacks, harmless or informational attacks, etc. These patterns may, for example, be referred to as "minor civility patterns" and "monitoring patterns," respectively, and each provide a corresponding security service.

During time of relatively high network congestion, IDP device 4A may preserve network connectivity at the expense of security. However, unlike statically configured IDP devices, IDP device 4A may not require administrator intervention to return to optimal security detection once congestion levels return to normal. Instead, IDP device 4A may automatically provision the application of policies 32 such that the old or first one of policies 32 is applied to once again begin detecting the full set of patterns 39.

Although described above with respect to fast path and first path packets and flows, the techniques may be implemented in such a manner as to differentiate between flows based on other characteristics, such as quality of service, priority of application, application, etc. For example, admin 36 may configure dynamic security manager 20 of IDP device 4A in a manner similar to that described above to favor, in terms of network connectivity, HTTP applications over FTP applications, which may cause classifier module 26 to forward without further processing (e.g., application of one of policies 32 to) packets associated with HTTP applications while applying further processing to packets associated with FTP applications. That is, dynamic security manager 20 may take into account a priority assigned to each application, e.g., HTTP application, when determining the application of policies 32.

As another example, admin 36 may configure IDP device 4A in a manner similar to that described above to forward without further processing those packets having a certain quality, type or level of service defined in each packet while further processing those packets having a different quality, type or level of service. Thus, the techniques should not be limited strictly to selectively application of policies 32 based only on first and fast path classifications, but may include any other type of classification commonly employed to classify packets prior to processing by a network security device.

In the example of FIG. 3B, the dynamic policy provisioning techniques are extended to encompass a finer level of granularity than that described with respect to IDP device 4A of FIG. 3A. With respect to IDP device 4A, dynamic security manager 20 was described as comparing indicator 41 against threshold 42 and applying one of policies 32 based on the comparison. If indicator 41 was equal to or greater than threshold 42, dynamic security manager 20 instructed classifier module 26 to forward first path packets without applying any one of policies 32 to these first path packets, thereby possibly preserving network connectivity automatically during times of high network congestion.

Dynamic security manager 20, as shown with respect to IDP device 4B of FIG. 3B however, includes a governance algorithm 45, instead of threshold 42, that determines which one of policies 32 to apply to the packets given the values of the monitored parameters or a representation of these values as indicator 41. Governance algorithm 45 may be configured by admin 30 such that, for each range of indicator 41, dynamic security manager 20 dynamically provisions servicing engine 28 to apply a different one of policies 32. For example, assuming indicator 41 cannot vary beyond a range of zero through 100, e.g., has been normalized, admin 30 may configure governance algorithm 45 to apply policy 32A when indicator 41 is equal to or greater than zero and less than 10, policy 32B when indicator 41 is equal to or greater than 10 and less than 25, policy 32C when indicator 41 is equal to or greater than 25 but less than 77, and policy 32N when indicator 41 is equal to or greater than 77 but less than or equal to 100.

Considering the above, IDP device 4B may therefore dynamically determine based on governance algorithm 54 whether to apply a third policy different from the first and second policies and apply the third policy to the network traffic based on the dynamic determination of whether to apply the third policy. IDP device 4B may then forward the network traffic based on the application of this third policy, thereby permitting a further level of granularity as more than two policies may be applied.

In some instances, again assuming indicator 41 has been normalized such that it cannot vary beyond the range of zero through 100, admin 30 may configure governance algorithm 45 such that two or more of policies 32 are defined for or associated with each range, where a first one of the two or more of policies 32 for a first range applies to a first application, e.g., a HTTP application, and a second one of the two or more of policies 32 for the first range applies to a second application, e.g., an FTP application. In this manner, dynamic security manager 20 may automatically update or dynamically provision the above described configurable table of associations between applications and policies of classifier module 26 by informing classifier module 26 of the changes in polices on a per application basis, whereupon classifier module 26 may update its table to reflect these changes in the application of policies 32.

Similar to that described above with respect to FIG. 3A, dynamic security manager 20 of IDP device 4B may also inform table management module 24 of the changes in application of policies 32. Table management module 24 may update flow table 34 with the changes in the application of policies 32 by updating the associated policy identifier for each flow entry in flow table 34. Servicing engine 28 may retrieve packets stored to queues 38 and apply the associated one of policies 32 identified by the tag stored with each of the packets in queues 38. That is, servicing engine 28 may access the one of policies 32 identified by the corresponding tag and apply one or more of patterns 39 identified by the one of policies 32 accessed. Based on the application of the one of policies 32, servicing engine 28 may either drop the packet or forward the packet as secure outgoing traffic 46.

As compared to the forwarding of packets without applying one of policies 32, IDP device 4B of FIG. 3B may gradually scale back the application of patterns 39 to more finely balance security and network connectivity concerns. IDP device 4A of FIG. 3A favors network connectivity but sacrifices security when forwarding packets without applying any of patterns 39 to those first path packets. IDP device 4B of FIG. 3B enables admin 30 to, for example, define and apply policies 32 that gradually scale back the application of patterns 39. IDP device 4B may also incorporate the techniques described above with respect to IDP device 4A for one of the ranges defined by governance algorithm 45.

That is, admin 30 may define policy 32A to apply the full set of patterns 39 and configure governance algorithm 45 to apply policy 32A to every packet of incoming traffic 36 for a range of indicator 41 from zero to 40. Admin 30 may then define policy 32B to identify a subset of the full set of patterns 39 and configure governance algorithm 45 to apply policy 32B to every packet of incoming traffic 36 for a range of indicator 41 from 40 to 65. Admin 30 may next define policy 32C to identify a subset of patterns 39 identified by policy 32B and configure governance algorithm 45 to apply policy 32C to every packet of incoming traffic 36 for a range of indicator 41 from 65 to 90. Admin 30 may further define policy 32N to identify the same set of patterns of policy 32C, but configure governance algorithm 45 to apply policy 32N to only fast path packets of incoming traffic 36 for a range of indicator 41 from 90 to 100 and instruct classifier module 26 to forward without applying any one of policies 32 to those first path packets. In this manner, IDP device 4B may enable much more granular control over the application of policies 32, thereby enabling admin 30 to not only more finely balancing security and network connectivity concerns, but also tailor the application of policies 32 to suit a particular network, such as network 6.

Again, IDP device 4B, much like IDP device 4A, may be configured to take into account a level of service, a prioritization of applications (or "prioritization scheme"), etc. when selecting which of policies 32 to apply. That is, for example, governance algorithm 45 may be configured such that it determines what policies 32 to apply based on a prioritization of applications to gradually scale back application of policies 32 based on this prioritization scheme. Thus, for those packets corresponding to applications given a high forwarding priority, such as SIP packets for Voice over Internet Protocol (VoIP) connections, dynamic security manager 20 may determine in accordance with governance algorithm 45 that a second one of policies 32 should be applied that detects a subset of the full set of network attacks during times of moderate network congestion. But for other packets corresponding to applications assigned a lower forwarding priority, dynamic security manager 20 may determine, again in accordance with governance algorithm 45, that the first policy is to be applied to detect the full set of network attacks during the same moderate network congestion. This may enable fine-grained tailoring of the application of policies to different applications such that those applications assigned a higher priority may receive expedited processing.

Each of IDP devices 4A, 4B of both FIGS. 3A and 3B may further implement a heuristic process so at to avoid thrashing. Thrashing may occur in this context when indicator 41 is proximate in value to threshold 42 or one of the ranges described above with respect to governance algorithm 45. Thrashing refers to the repeated change of the application of policies 32 as a result of indicator 41 either equaling or exceeding threshold 42 or one of the ranges after a first calculation but not equaling or exceeding threshold 42 or the same one of the ranges after a second calculation. Thus, thrashing may cause unnecessary consumption of system resources, as dynamic security manager 20 may, for example, inform table management module 24 to apply one of policies 32 after the first calculation, but apply a second one of policies 32 after the second calculation, only to resort back to instructing table management module 24 to apply the first one of policies 32, etc.

As a result, dynamic security manager 20 may calculate indicator 41 in accordance with the heuristic process, compare indicator 41 to threshold 42 or governance algorithm 45 in accordance with the heuristic process, or some combination of both to avoid thrashing. For example, dynamic security manger 28 may heuristically calculate indicator 41 by averaging the value of indicator 41 over time, thereby decreasing the rate of change or fluctuations or by dynamically adjusting the weights used to calculate indicator 41 based on for example a time of day, etc. Dynamic security manager 20 may, as another example, be configured by admin 30 to only enable one policy change in a configurable period of time, such as one policy change per five minutes, thereby heuristically limiting the comparison of indicator 41 to threshold 42 or governance algorithm 45. By heuristically limiting thrashing, IDP devices 4A, 4B of both FIGS. 3A and 3B may decrease unnecessary consumption of system resources and improve throughput and efficiency.

Figure 4:
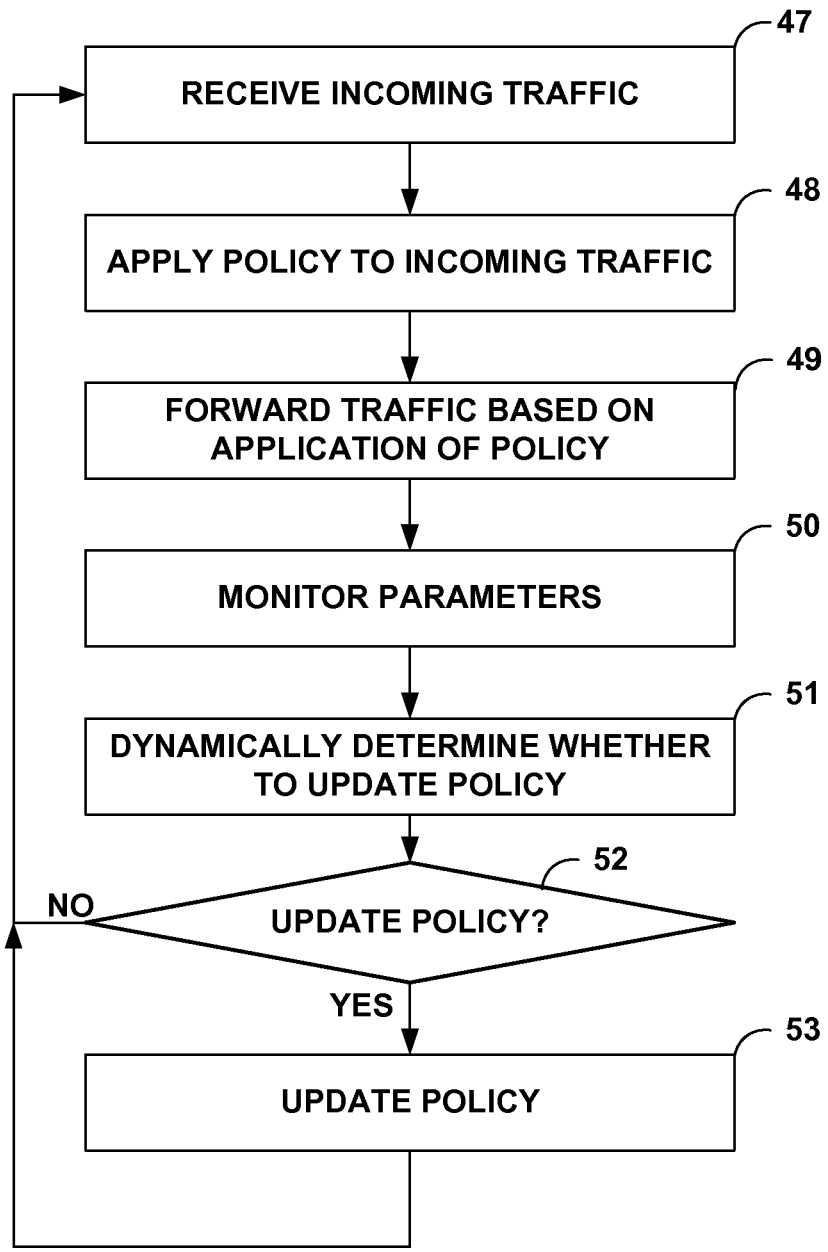
FIG. 4 is a flow chart illustrating exemplary operation of an IDP device in performing the dynamic policy provisioning techniques described herein.

FIG. 4 is a flow chart illustrating exemplary operation of an IDP device, such as general IDP device 4 of FIG. 2, in performing the dynamic policy provisioning techniques described herein. Although described with respect to IDP device 4 of FIG. 3A, the techniques may be implemented by any network security device. Moreover, although not shown in FIG. 3A, an administrator, such as admin 30 may initially configure IDP device 4 of FIG. 3A as described above to calibrate or otherwise define the operation of the dynamic policy provisioning techniques described herein.

After such configuration, IDP device 4 may receive incoming network traffic 36 as a plurality of packets and forward these packets to classifier module 26 (47). Classifier module 26 may, in the manner described above, classify each of these packets, determine a first one of policies 32 corresponding to each of these packets and queue these packets to one of queues 38 along with a corresponding tag identifying this first one of the policies 32. Servicing engine 38 may retrieve these packets from queues 38 and apply the first one of policies 32 identified by the tag to each of the retrieved packets (48). IDP device 4 may then forward the incoming network traffic based on the application of the first one of policies 32 (49).

While applying the first one of policies 32, system resource monitor 22 may periodically monitor the above listed parameters (50). Based on these parameters, dynamic security manager 20 may, as described above, dynamically determine, such as by way of a comparing indicator 41 to threshold 42 or in accordance with governance algorithm 45, whether to apply a second one of policies 32 to at least a portion of incoming traffic 36. That is, dynamic security manager 20 may dynamically determine whether to update application of polices 32 so as to apply a second one of policies 32 to at least a portion of newly received incoming traffic 36 (51). If dynamic security manager dynamically determines based on the vital parameters not to apply the second one of policies 32 ("NO" 52), IDP device 4 may continue to receive traffic 36, apply the first one of policies 32 and forward this traffic 36 based on the application of this one of policies 32, while monitoring the parameters and dynamically determining whether to apply a second or new one of policies 32 (47-51). If, however, dynamic security manager 20 dynamically determines that the second one of policies 32 is to be applied ("YES" 52), dynamic security manager 20 may inform at least table management module 24 to update the application of policies 32 (53).

Upon receiving this information, table management module 24 may update flow table 44 or, more particularly, flow entries of flow table 44 to reflect this change in policy, thereby causing classifier module 26 to queue at least some of the packets or a portion of network traffic 36 in queues 38 with corresponding tags identifying the second one of policies 32. Upon retrieving these packets from queues 38, servicing engine 28 may determine from the corresponding tags that the second one of policies 32 is to be applied to these packets and apply this second one of policies 32 to these packets (48). Servicing engine 28 may, based on the application of the second one of policies 32, forward at least some of the portion of incoming network traffic 36 as outgoing network traffic 40 (49). In this respect, the second or new one of policies 32 may, after application of such policy, represent the first or old one of policies 32 and IDP device 4 may continually monitor the parameters and dynamically determine whether to apply a second or new one of polices 32, or in other words, perform the dynamic policy provisioning techniques described herein (47-53).

Figure 5A:
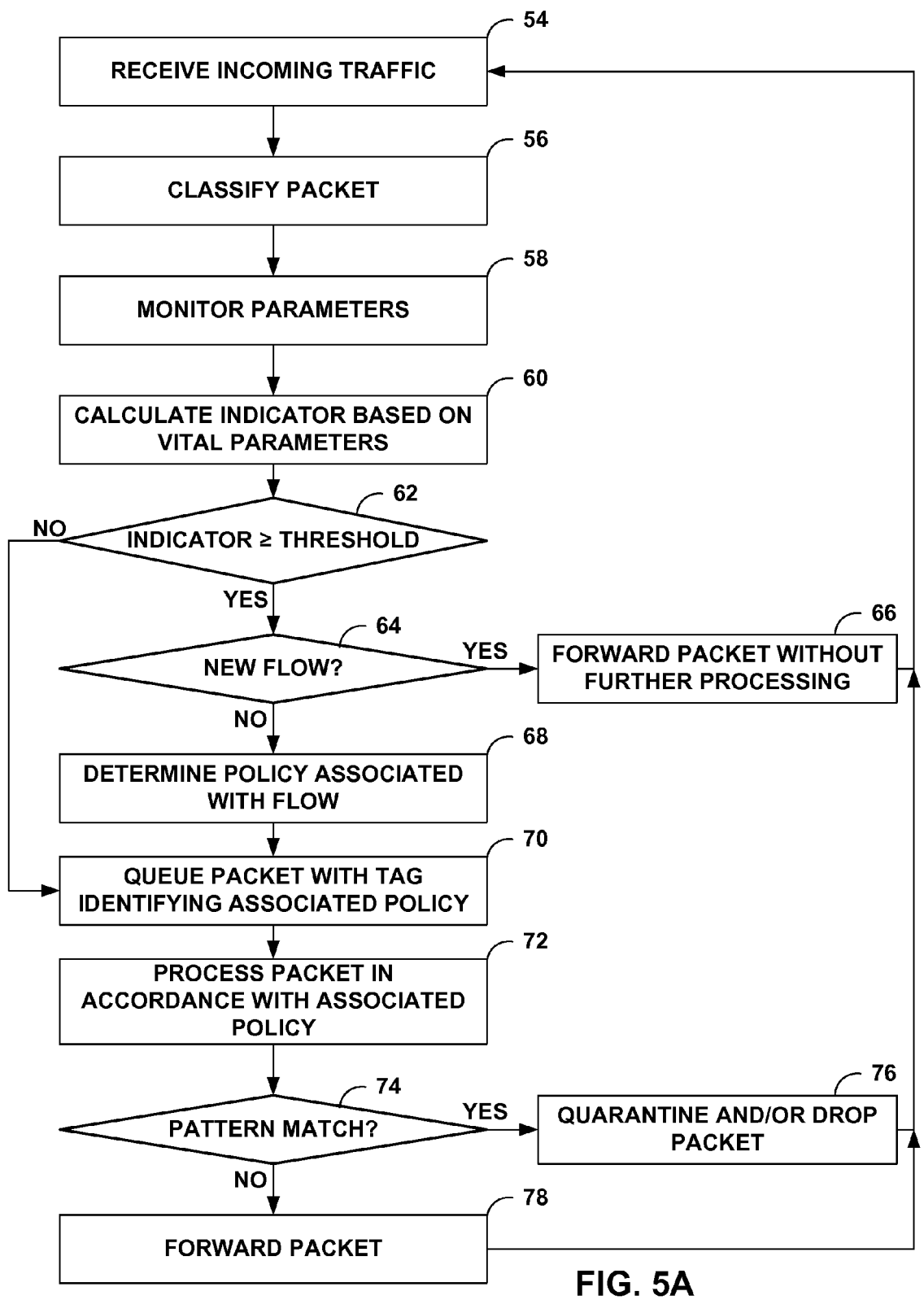
FIGS. 5A and 5B are flow charts each illustrating exemplary operation of an IDP device in performing various aspects of the dynamic policy provisioning techniques described herein.
Figure 5B:
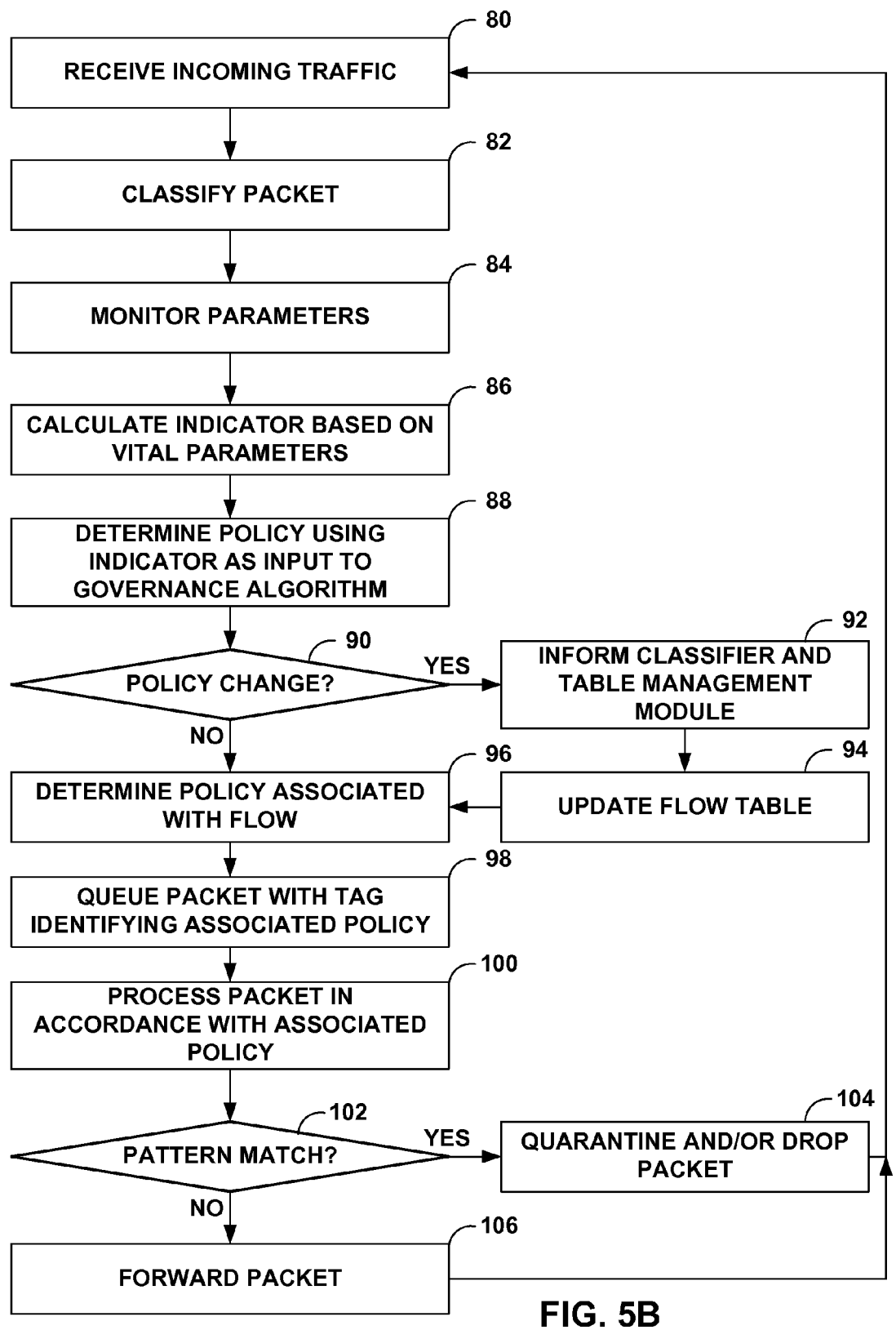

FIGS. 5A, 5B are flow charts each illustrating exemplary operation of an IDP device, e.g., IDP devices 4A, 4B of FIGS. 3A, 3B, respectively, in performing various aspects of the dynamic policy provisioning techniques described herein. FIG. 5A is a flow chart illustrating exemplary operation of IDP device 4A of FIG. 3A, where IDP device 4A determines, in response to a condition of network 6, to forward first path packets without applying any policies, such as one of policies 32. Although described with respect to IDP device 4A of FIG. 3A, the techniques may be implemented by any network security device.

Moreover, although not shown in FIG. 3A, an administrator, such as admin 30 may initially configure IDP device 4A of FIG. 3A as described above to calibrate or otherwise define the operation of the dynamic policy provisioning techniques described herein. After such configuration, IDP device 4A may receive incoming network traffic 36 as a plurality of packets and forward these packets to classifier module 26 (54). Classifier module 26 may classify these packets in the manner described above (56).

Meanwhile, simultaneous to such classification, system resource monitor 22 may monitor one or more of the parameters listed above and pass values corresponding to these monitored parameters to dynamic security manager 20 (58). Dynamic security manager 20 may calculate indicator 41 in the manner described above based on these values corresponding to one or more of the monitored parameters and compare indicator 41 to threshold 42 (60, 62). If indicator 41 is greater than or equal to threshold 42 ("YES" 62), dynamic security manager 20 may instruct classifier module 26 to apply one of policies 32 only to existing or fast path flows while forwarding those packets corresponding to new of first path flows. Therefore, classifier module 26 may determine, in the above described manner, whether a packet corresponds to a new flow if indicator 41 is greater than or equal to threshold 42 (64).

If one of the packets belongs to a new flow ("YES" 64), classifier module 26 may forward this packet without further processing, e.g., queuing and subsequently de-queuing and applying one of policies 32 to the packet, as unsecure outgoing traffic 44B (66). However, if the packet corresponds to a fast path flow, e.g., an existing flow in flow table 34, or indicator 41 is less than threshold 42 ("NO" 62; "NO" 64), classifier module 26 may determine one of policies 32 associated with the flow (68). If indicator 41 is less than threshold 42, classifier module 26 may determine which of policies 32 to apply to new or first path flows, for example, from dynamic security manager 20 or from a table having configurable associations between applications and policies 32, as described above. Classifier module 26 may determine which flow to apply to fast path packets using a five-tuple extracted from each fast path packet as a key to access a flow entry of flow table 34 identifying the associated policy.

Regardless of how the associated one of policies 32 is determined, classifier module 26 may queue this packet along with a tag identifying the associated one of policies 32 (70). Servicing engine 28 may, at some later time, de-queue this packet and process the packet, as described above, in accordance with the one of policies 32 identified by the corresponding tag (72). Servicing engine 28 may apply the one of policies 32 by applying a set of patterns 39 identified by the associated one of policies 32 to determine whether one of the set of patterns 39 match the data presented by the packet and subsequent transaction, flow or session state (74). A pattern match may occur, as described above, based on particular session information, protocol anomaly, string or pattern comparison, application-specific information, or any other indicator of malicious activity.

If such a match occurs ("YES" 74), servicing engine 28 may quarantine and/or drop the packet (76). Servicing engine 28 may quarantine the packet by placing the packet in a portion of memory only accessible by servicing engine 28, thereby preventing further distribution of such malicious patterns. If not ("NO" 74), servicing engine 28 may forward the traffic as secure outgoing traffic 44A (78). After processing each packet by either forwarding without further processing (66), quarantining and/or dropping each packet (68) or forwarding after processing (78), IDP device 4A may continue to receive and process incoming network traffic 36 in accordance with the above dynamic policy provisioning techniques (54-78).

Moreover, although described above as applying the associated one of policies 32, instead of a old or first one and a new or second one of policies 32, the techniques described with respect to FIG. 5A may, as described above, be implemented such that the old and the new ones of policy 32 are the same one of policies 32. In this respect, dynamic security manager 20 may apply the second policy by applying the first policy only to the fast path packets to adapt to the application of policies 32 to a particular type or class of packet, e.g., fast path packets only, instead of dynamically altering the extent to which patterns 39 are applied, e.g., by applying only a subset of patterns 39 instead of the full set of patterns 39. FIG. 5B below provides a flow chart illustrating the latter dynamic application of policies 32.

FIG. 5B is a flow chart illustrating exemplary operation of IDP device 4B of FIG. 3B, where IDP device 4B determines, in response to a condition of network 6, whether to apply one or more of policies 32. Although described with respect to IDP device 4B, the techniques may be implemented by any network security device.

Moreover, although not shown in FIG. 5B, an administrator, such as admin 30 may initially configure IDP device 4B as described above to calibrate or otherwise define the operation of the dynamic policy provisioning techniques described herein. After such configuration, IDP device 4B may receive incoming network traffic 36 as a plurality of packets and forward these packets to classifier module 26 (80). Classifier module 26 may classify these packets in the manner described above (82).

Meanwhile, simultaneous to such classification, system resource monitor 22 may monitor one or more of the parameters listed above and pass values corresponding to these monitored parameters to dynamic security manager 20 (84). Dynamic security manager 20 may calculate indicator 41 in the manner described above based on these values corresponding to one or more of the monitored parameters (86). Dynamic security manager 20 may then use indicator 41 as input into governance algorithm 45, which may output one of policies 32. That is, governance algorithm 45 may be considered, as described above, as a set of ranges, each range associated with one or more of policies 32. Governance algorithm 45 may determine in which of the set of ranges indicator 41 resides and output an associated one of policies 32. These set of ranges may alternatively be construed as a plurality of thresholds, similar to threshold 42, each threshold identifying the start of the next range. In this respect, IDP device 4B may operate similar to IDP device 4A, as illustrated in FIG. 3A, but provide more granular control over the application of policies 32.

While described herein with respect to a set of ranges or a plurality of thresholds, governance algorithm 45 may comprise other more complex algorithms that take into account past or historical values of indicator 41 and/or one or more of the above listed parameters. Governance algorithm 45 may therefore learn or adapt to this historical data to further refine the application of policies 32. Thus, although described herein with respect to a set of ranges, governance algorithm 45 should not be so limited, but instead may comprise any algorithm capable of determining which of a plurality of policies 32 (or rules, objects, etc.) to apply based on a varying condition, such as that indicated by indicator 41.

After dynamically determining one or more of policies 32 using governance algorithm 45, dynamic security manager 20 may determine if the determined one or more of policies 32 represent different ones of policies 32 from those previously applied. That is, dynamic security manager 20 may determine if the one or more policies 32 applied immediately prior to the determination of the current one or more policies 32 are different. Thus, dynamic security manager 20 determines if a policy change has occurred (90).

If a policy change has occurred, e.g., those previous one or more of policies 90 are different from the current one or more of policies 32 ("YES" 90), dynamic security manager 20 may inform, instruct, or otherwise indicate this change to classifier module 26 and table management module 24, such that classifier module 26 may properly associate policies with new first path flows and table management module 24 may properly update flow entries within flow table 34 (92). In both respect, classifier module 26 and table management module 24 may use the indication of updated, new or second policies to update flow table 34 (94).

Classifier module 26 may, in parallel with the above policy change determination, determine one of policies 32 associated with the flow (96). Classifier module 26 may determine which of policies 32 to apply to new or first path flows, for example, from dynamic security manager 20 or from a table having configurable associations between applications and policies 32, as described above. Classifier module 26 may determine which flow to apply to fast path packets using a five-tuple extracted from each fast path packet as a key to access a flow entry of flow table 34 identifying the associated policy.

Regardless of how the associated one of policies 32 is determined, classifier module 26 may queue this packet along with a tag identifying the associated one of policies 32 (98). Servicing engine 28 may, at some later time, de-queue this packet and process the packet, as described above, in accordance with the one of policies 32 identified by the corresponding tag (100). Servicing engine 28 may apply the one of policies 32 by applying a set of patterns 39 identified by the associated one of policies 32 to determine whether one of the set of patterns 39 match the pattern presented by the packet and subsequent transaction, flow or session state (102). A pattern match may occur, as described above, based on particular session information, protocol anomaly, string or pattern comparison, application-specific information, or any other indicator of malicious activity.

If such a match occurs ("YES" 102), servicing engine 28 may quarantine and/or drop the packet (104). Servicing engine 28 may quarantine the packet by placing the packet in a portion of memory only accessible by servicing engine 28, thereby preventing further distribution of such malicious patterns. If not ("NO" 102), servicing engine 28 may forward the traffic as secure outgoing traffic 44A (106). After processing each packet either by quarantining and/or dropping each packet (104) or forwarding after processing (106), IDP device 4 may continue to receive and process incoming network traffic 36 in accordance with the above dynamic policy provisioning techniques (80-106).

In this manner, IDP device 4B may dynamically apply a second policy to all of incoming network traffic 36 based on the parameters rather than applying the second policy only to at least a portion or some of incoming network traffic 36. IDP device 4B may therefore forward only secure outgoing network traffic 46, instead of both secure and unsecure network traffic 44A, 44B, respectively. IDP device 4B may enable the output of only secure network traffic 46 by scaling back the application of patterns 39 through dynamic application of configurable policies 32. In this respect, IDP device 4B by way of a configurable governance algorithm 45 may provide more granular control with a possible result being that security and network connectivity concerns can be more finely balanced by admin 30.

Figure 6:
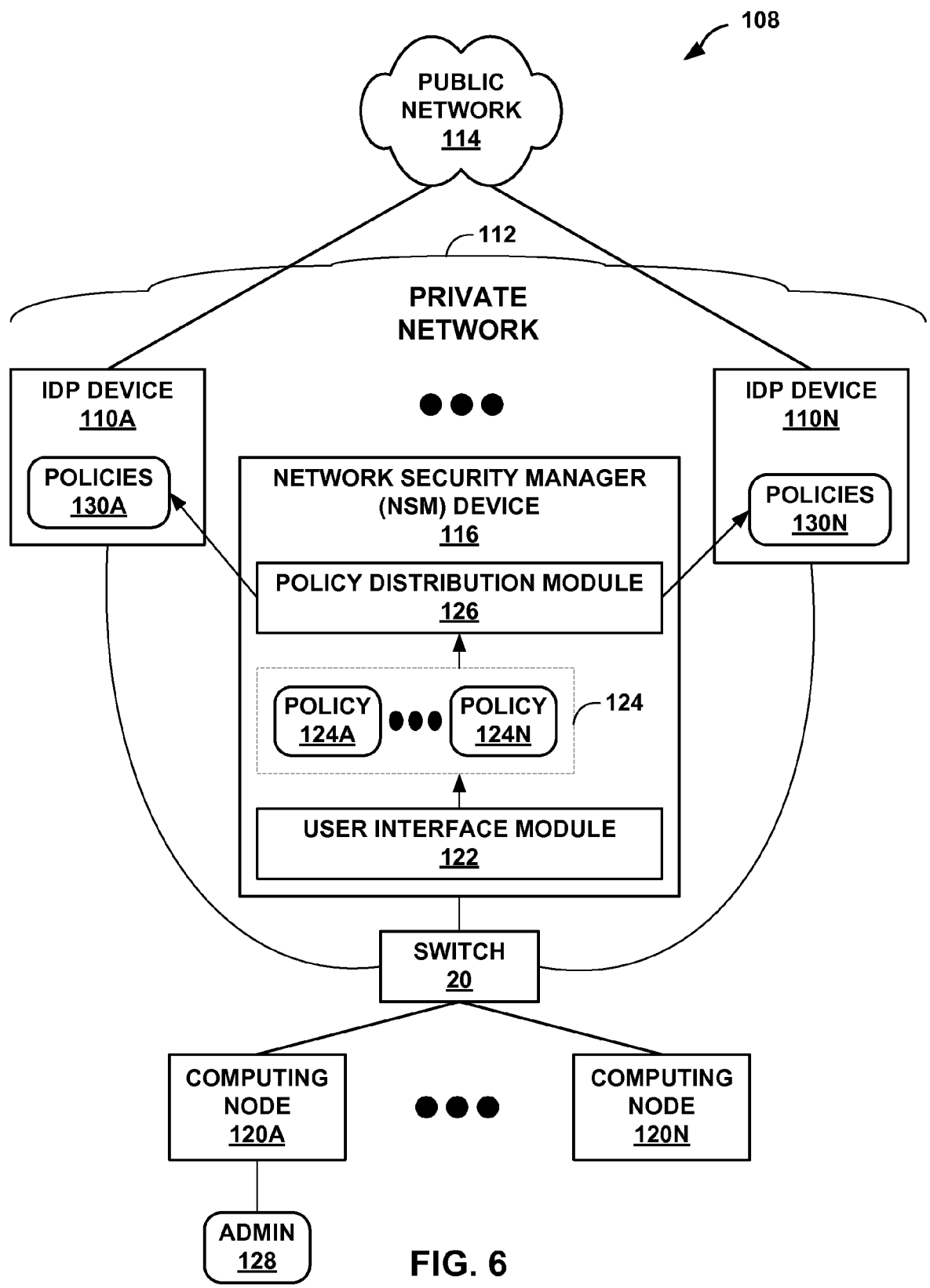
FIG. 6 is a block diagram illustrating an exemplary system in which a plurality of IDP devices are configured to perform the dynamic policy provisioning techniques described herein.

FIG. 6 is a block diagram illustrating an exemplary system 108 in which a plurality of IDP devices 110A-110N are configured to perform the dynamic policy provisioning techniques described herein. Each of the plurality of IDP devices 110A-110N ("IDP devices 110") may be substantially similar to IDP device 4 of FIG. 1. Each of IDP devices 110 may further comprise similar modules, control units and other elements to IDP device 4A or 4B either of FIG. 3A or 3B.

As shown in FIG. 6, system 108 includes a private network 112 similar to private network 6 and a public network 114 similar to public network 8. Private network 112 includes IDP devices 110, which each couples to public network 114, and network security manager (NSM) device 116, which manages security of private network 112. Similar to private network 6, private network 112 also includes a switch 118 and a plurality of computing nodes 120A-120N ("computing nodes 120"). While not shown in FIG. 6 for ease of illustration purposes, private network 112, similar to private network 6, may include one or more firewalls as well as additional switches, similar to switch 12, NSM device, similar to NSM device 116, and any other network device listed above.

NSM device 116 includes a user interface module 122, a plurality of policies 124A-124N ("policies 124") and a policy distribution module 126. User interface module 122 and policies 124 may be substantially similar to user interface module 18 and policies 32 of FIGS. 3A, 3B. User interface module 22, in this instance, interacts with admin 128 by transmitting a user interface via switch 12 to computing node 20A by which admin 128 via interactions with computing node 120A and the user interface may specify, configure, update, alter or otherwise edit, create or delete policies 124. While shown as a network based user interface module 122, admin 128 may interact with user interface module 122 directly as shown in FIGS. 3A, 3B. Admin 128 may also interact with user interface module 122 to remotely configure each of IDP devices 110 in the manner described above.

Policy distribution module 126 may distribute policies 124 to each of IDP devices 110 for application to incoming network traffic. As described above, incoming network traffic may comprise both traffic leaving private network 112 and entering private network 112 and thus refers to traffic incoming with respect to IDP devices 110. Outgoing traffic may not refer to any particular direction but merely to traffic leaving IDP device 110 from the perspective of IDP devices 110 alone. Thus, the techniques should not be limited to any directional or particular flow.

Policy distribution module 126 may distribute these policies 124 to IDP devices 110 at the request of IDP devices 110, such as a periodic polling for new policies 110 by IDP devices 110, or upon receiving a new or altered one of policies 124, as defined, altered, or deleted by user interface module 122. In the latter instance where policy distribution module 126 updates IDP devices in response to changes by user interface module 122, policy distribution module 126 may push these changes to IDP device 110. The policies stored to IDP devices 110 are shown in FIG. 4 as policies 130A-130N ("policies 130"). While referred to using the same identifier "130," these policies 130 should not be construed as each comprising the same set of policies 124. That is, policies 130A may define a first set of policies 124 while policies 130N define a second set of policies 124. Thus, admin 128 may uniquely configure one or more of IDP devices 110 with a particular set of policies 124 and not all of policies 130 may comprise the same set of policies 124. In other words, policies 124 may comprise a superset of policies 130.

Using NSM device 116, admin 128 may more efficiently manage the plurality of IDP devices 110 by not having to access each of IDP devices 110 and individually configure every one of policies 130 for each of IDP devices 110. Admin 128 may instead access NSM device 116 and interact with a network graphical user interface transmitted by user interface module 122 to remotely configure IDP devices 110 with policies 130 and any of the other configurable parameters described above.

While described herein with respect to particular combinations of features and limitations, or more particularly, devices, elements, modules, components, and units, the techniques may apply to any combination of limitations or features (again, more particularly, devices, elements, modules, components, and units). The techniques therefore should not be limited to the particular combination of features above but may include any such combination. Various embodiments of the invention have been described. These and other embodiments are within the scope of the following claims.

The invention claimed is:

1. A method comprising:
receiving, with a network security device of a network, network traffic;
while processing the network traffic, monitoring, with the network security device, a level of utilization of one or more internal hardware resources of the network security device;
when the level of utilization of the one or more internal hardware resources is less than a threshold, applying, with the network security device, a first policy to the network traffic to detect a first set of network attacks, wherein the first policy identifies a first set of attack patterns that correspond to the first set of network attacks;
when the level of utilization of the one or more internal hardware resources equals or exceeds the threshold, applying, with the network security device, the second policy to at least a portion of the network traffic to detect a second set of network attacks, wherein the second policy identifies a second set of attack patterns that correspond to the second set of network attacks, and wherein the first set of attack patterns and the second set of attack patterns identify at least one different attack pattern; and
forwarding, with the network security device, at least the portion of the network traffic based on the application of the first policy or the second policy.

2. The method of claim 1,
wherein the network security device internally comprises a first path for processing initial packets of new packet flows and a fast path for processing packets for existing packet flows,
wherein the second policy specifies that the second set of attack patterns are to be applied to the initial packets of the fast path without application to the packets of the first path.

3. The method of claim 1, further comprising:
configuring the threshold by which to determine when to dynamically apply the second policy,
calculating, based on the level of utilization of the one or more internal hardware resources, an indicator that represents a condition of the network,
wherein applying the second policy comprises:
comparing the indicator to the threshold; and
applying the second policy to at least the portion of the network traffic when the indicator equals or exceeds the threshold.

4. The method of claim 3,
wherein the first set of patterns include a full set of attack patterns,
wherein the first set of network attacks include a full set of known network attacks,
wherein the second set of network attacks include a subset of the full set of known attack patterns, and wherein the second policy identifies a subset of the full set of attack patterns that correspond to the subset of the full set of network attacks.

5. The method of claim 1, wherein the first set of attack patterns include the second set of attack patterns and an additional set of attack patterns that correspond to the second set of network attacks and an additional set of network attacks.

6. The method of claim 1,
wherein the threshold comprises a first threshold, and
wherein the method further comprises:
when the level of utilization of the one or more internal hardware resources equals or exceeds a second threshold, applying, with the network security device, a third policy to the network traffic; and
forwarding, with the network security device, the network traffic based on the application of the third policy.

7. The method of claim 1, wherein applying the first policy to the network traffic includes:
classifying a packet of the network traffic by (i) extracting a five-tuple from the packet, (ii) retrieving, from a flow table that stores a plurality of flow entries, one of the plurality of flow entries that correspond to the extracted five-tuple and (iii) determining that the first policy is associated with the packet in the retrieved one of the plurality of flow entries;
storing the packet to a queue of the network security device with a tag that identifies the first policy;
retrieving the packet and the corresponding tag from the queue; and
processing the packet by applying the first policy indicated by the tag to the packet.

8. The method of claim 7, further comprising updating, with the network security device, the flow table when the indicator equals or exceeds the threshold such that one or more of the plurality of flow entries are updated to associate one or more corresponding flows with the second policy,
wherein applying the second policy comprises:
classifying another packet of the network traffic by (i) extracting another five-tuple from the other packet, (ii) retrieving one of the plurality of updated flow entries that correspond to the other five-tuple and (iii) determining that the second policy is associated with the packet in the retrieved one of the plurality of updated flow entries;
storing the other packet to a queue of the network security device with another tag that identifies the second policy;
retrieving the other packet and the corresponding other tag from the queue; and
processing the other packet by applying the second policy indicated by the other tag to the packet.

9. The method of claim 1, wherein the network security device comprises one of an intrusion prevention device, an intrusion detection device, and an intrusion detection and prevention (IDP) device.

10. The method of claim 1, further comprising receiving the first and second policies via either direct interaction between the network security device and an administrator or remotely from a network security management (NSM) device.

11. The method of claim 1, wherein the parameters include a queue depth, a memory resource, a queue threshold, a processor utilization, and a number of sessions.

12. The method of claim 1, further comprising:
classifying the incoming network traffic to determine a first packet of the network traffic and a second packet of the network traffic, wherein the first packet has a first characteristic and the second packet has a second characteristic different from the first characteristic,
wherein applying the second policy comprises applying the second policy by applying the first policy only to the first packet, and
wherein forwarding the portion of the network traffic comprises:
forwarding the second packet without applying the first or second policies to the second packet; and
forwarding the first packet based on the application of the first policy to the first packet.

13. A network security device of a network that receives network traffic comprising:
a memory that stores a first policy and a second policy, wherein the first policy identifies a first set of attack patterns that correspond to a first set of network attacks, the second policy identifies a second set of attack patterns that correspond to the second set of network attacks, and the first set of attack patterns and the second set of attack patterns identify at least one different attack pattern; and
a control unit that monitors, while processing the network traffic, a level of utilization of one or more internal hardware resources of the network security device, when the level of utilization of the one or more internal hardware resources is less than a threshold, applies the first policy to the network traffic to detect the first set of network attacks, when the level of utilization of the one or more internal hardware resources equals or exceeds the thresholds, applies the second policy to at least a portion of the network traffic to detect a second set of network attacks based on the dynamic determination, and forwards at least the portion of the network traffic based on the application of the first policy or the second policy.

14. The network security device of claim 13,
wherein the control unit comprises a first path for processing initial packets of new packet flows and a fast path for processing packets for existing packet flows,
wherein the second policy specifies that the second set of attack patterns are to be applied to the initial packets of the fast path without application to the packets of the first path.

15. The network security device of claim 13, wherein the control unit comprises a dynamic security manager module that configures the threshold by which to determine whether to apply the second policy, calculates, based on the level of utilization of the one or more internal hardware resources, an indicator that represents a condition of the network, and
compares the indicator to the threshold; and
dynamically selects to apply the second policy to at least the portion of the network traffic when the indicator equals or exceeds the threshold.

16. The network security device of claim 15,
wherein the first set of patterns include a full set of attack patterns,
wherein the first set of network attacks include a full set of known network attacks,
wherein the second set of network attacks include a subset of the full set of known attack patterns, and
wherein the second policy identifies a subset of the full set of attack patterns that correspond to the subset of the full set of network attacks.

17. The network security device of claim 13, wherein the first set of attack patterns include the second set of attack patterns and an additional set of attack patterns that correspond to the second set of network attacks and an additional set of network attacks.

18. The network security device of claim 13,
wherein the threshold comprises a first threshold, and
wherein the control unit further, when the level of utilization equals or exceeds a second threshold, applies a third policy to at least the portion of the network traffic, the third policy different from the first and second policies in that the third policy identifies at least one attack pattern different from the first and second sets of attack patterns and forwards the network traffic based on the application of the third policy.

19. The network security device of claim 13,
wherein the memory further includes a flow table that stores a plurality of flow entries, and
wherein, to apply the first policy to the network traffic, the control unit includes:
a classifier module that classifies a packet of the network traffic by (i) extracting a five-tuple from the packet, (ii) retrieving, from the flow table, one of the plurality of flow entries that correspond to the extracted five-tuple and (iii) determining that the first policy is associated with the packet in the retrieved one of the plurality of flow entries, and stores the packet to a queue of the network security device with a tag that identifies the first policy; and
a servicing engine that retrieves the packet and the corresponding tag from the queue and processes the packet by applying the first policy indicated by the tag to the packet.

20. The network security device of claim 19, wherein the control unit further includes:
a table management module that, in response to the dynamic security manager module dynamically determining to apply the second policy, updates the flow table such that one or more of the plurality of flow entries are updated to associate one or more corresponding flows with the second policy,
wherein, to apply the second policy, the classifier module classifies another packet of the network traffic by (i) extracting another five-tuple from the other packet, (ii) retrieving one of the plurality of updated flow entries that correspond to the other five-tuple and (iii) determining that the second policy is associated with the packet in the retrieved one of the plurality of updated flow entries and stores the other packet to a queue of the network security device with another tag that identifies the second policy,
wherein, to further apply the second policy, the servicing engine retrieves the other packet and the corresponding other tag from the queue and processes the other packet by applying the second policy indicated by the other tag to the packet.

21. The network security device of claim 13, wherein the network security device comprises one of an intrusion prevention device, an intrusion detection device, and an intrusion detection and prevention (IDP) device.

22. The network security device of claim 13, wherein the control unit further includes a user interface module that receives the first and second policies via either direct interaction with an administrator or remotely from a network security management (NSM) device.

23. The network security device of claim 13, wherein the parameters include a queue depth, a memory resource, a queue threshold, a processor utilization, and a number of sessions.

24. The network security device of claim 13,
wherein the control unit further classifies the incoming network traffic to determine a first packet of the network traffic and a second packet of the network traffic, wherein the first packet has a first characteristic and the second packet has a second characteristic different from the first characteristic,
wherein the control unit includes a servicing engine that applies the second policy by applying the first policy only to the first packet based on the dynamic determination,
wherein the control unit includes a classifier module that forwards the portion of the network traffic by forwarding the second packet without applying the first or second policies to the second packet,
wherein the servicing engine forwards the first packet based on the application of the first policy to the first packet.

25. A network system comprising:
a plurality of computing nodes of a network that transmit and receive network traffic;
a plurality of network security devices of the network that process the network traffic; and
a network security manager (NSM) device that distributes a plurality of policies to each of the plurality of network security devices,
wherein each of the plurality of network security devices includes:
a memory that stores a first one of the plurality of policies and a second one of the plurality of policies, wherein the first one of the plurality of policies identifies a first set of attack patterns that correspond to a first set of network attacks, the second one of the plurality of policies identifies a second set of attack patterns that correspond to the second set of network attacks, and the first set of attack patterns and the second set of attack patterns identify at least one different attack pattern; and
a control unit that monitors, while processing the network traffic, a level of utilization of one or more internal hardware resources of the network security device, when the level of utilization of the one or more internal hardware resources is less than a threshold, applies the first policy to the network traffic to detect the first set of network attacks, when the level of utilization of the one or more internal hardware resources equals or exceeds the thresholds, applies the second policy to at least a portion of the network traffic to detect a second set of network attacks based on the dynamic determination, and forwards at least the portion of the network traffic based on the application of the first policy or the second policy.

26. The network system of claim 25,
wherein the network security device internally comprises a first path for processing initial packets of new packet flows and a fast path for processing packets for existing packet flows,
wherein the second one of the plurality policies specifies that the second set of attack patterns are to be applied to the initial packets of the fast path without application to the packets of the first path.

27. The network system of claim 25, wherein the control unit of each of the plurality of network security devices comprises a dynamic security manager module that configures the threshold by which to determine whether to apply the second policy, calculates, based on the level of utilization of the one or more internal hardware resources, an indicator that represents a condition of the network, and compares the indicator to the threshold; and dynamically selects to apply the second policy to at least the portion of the network traffic when the indicator equals or exceeds the threshold.

28. The network system of claim 27, wherein the first set of patterns include a full set of attack patterns, wherein the first set of network attacks include a full set of known network attacks, wherein the second set of network attacks include a subset of the full set of known attack patterns, and wherein the second one of the policies identifies a subset of the full set of attack patterns that correspond to the subset of the full set of network attacks.

29. The network security device of claim 25, wherein NSM device distributes the first one and second one of the policies of a first one of the plurality of network security devices are different from the first one and second one of the plurality of policies of a second one of the plurality of network security devices.

30. A non-transitory computer-readable storage medium comprising instructions for causing a programmable processor to:

receive, with a network security device of a network, network traffic;

while processing the network traffic, monitor, with the network security device, parameters corresponding to utilization of one or more internal resources of the network security device;

when the level of utilization of the one or more internal hardware resources is less than a threshold, apply, with the network security device, a first policy to the network traffic to detect a first set of network attacks, wherein the first policy identifies a first set of attack patterns that correspond to the first set of network attacks;

when the level of utilization of the one or more internal hardware resources equals or exceeds the threshold, apply, with the network security device, the second policy to at least a portion of the network traffic to detect a second set of network attacks, wherein the second policy identifies a second set of attack patterns that correspond to the second set of network attacks, and wherein the first set of attack patterns and the second set of attack patterns identify at least one different attack pattern; and forward, with the network security device, at least the portion of the network traffic based on the application of the first policy or the second policy.

31. A method comprising:

receiving, with a network security device of a network, network traffic, wherein the network security device internally comprises a first path for processing initial packets of new packet flows and a fast path for processing packets for existing packet flows;

while processing the network traffic, monitoring, with the network security device, a level of utilization of one or more internal hardware resources of the network security device;

when the level of utilization of the one or more internal hardware resources is less than a threshold, applying, with the network security device, a first policy to the network traffic to detect a first set of network attacks, wherein the first policy identifies a first set of attack patterns that correspond to the first set of network attacks;

when the level of utilization of the one or more internal hardware resources equals or exceeds the threshold, applying, with the network security device, the second policy to at least a portion of the network traffic, wherein the second policy specifies that the first set of attack patterns are to be applied to all the packets of the fast path for the existing packet flows setup prior to the dynamic determination and without application to all the packets of the new flows that go through the first path after the dynamic determination; and forwarding, with the network security device, at least the portion of the network traffic based on the application of the first policy or the second policy.

\* \* \* \* \*